US012711975B2

(12) United States Patent
Ke et al.

(10) Patent No.: US 12,711,975 B2
(45) Date of Patent: Aug. 18, 2026

(54) SPEECH NOISE REDUCTION MODEL TRAINING METHOD AND APPARATUS, SPEECH SCORING METHOD AND APPARATUS, DEVICE, STORAGE MEDIUM, AND PROGRAM PRODUCT

(71) Applicant: Tencent Technology (Shenzhen) Company Limited, Shenzhen (CN)

(72) Inventors: Dengfeng Ke, Shenzhen (CN); Yanlu Xie, Shenzhen (CN); Jinsong Zhang, Shenzhen (CN); Binghuai Lin, Shenzhen (CN); Liyuan Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 385 days.

(21) Appl. No.: 18/139,263

(22) Filed: Apr. 25, 2023

(65) Prior Publication Data

US 2023/0267943 A1 Aug. 24, 2023

Related U.S. Application Data

(63) Continuation of application No. PCT/CN2022/112461, filed on Aug. 15, 2022.

(30) Foreign Application Priority Data

Sep. 2, 2021 (CN) ......................... 202111025632.X

(51) Int. Cl.
*G10L 21/0208* (2013.01)
*G10L 15/00* (2013.01)
*G10L 25/51* (2013.01)

(52) U.S. Cl.
CPC .......... *G10L 21/0208* (2013.01); *G10L 15/00* (2013.01); *G10L 25/51* (2013.01)

(58) Field of Classification Search
CPC ...... G10L 21/0208; G10L 15/00; G10L 25/51
See application file for complete search history.

(56) References Cited

U.S. PATENT DOCUMENTS 8,355,914 B2 * 1/2013 Joh ....................... G06F 40/232 400/489
8,983,844 B1 3/2015 Thomas et al.
(Continued)

FOREIGN PATENT DOCUMENTS

CN 105357006 A * 2/2016 ............. G10L 17/04
CN 106782504 A * 5/2017 ......... G10L 21/0208
(Continued)

OTHER PUBLICATIONS

Tencent Technology, ISR, PCT/CN2022/112461, Nov. 16, 2022, 3 pgs.

(Continued)

*Primary Examiner* — Mohammad K Islam
(74) *Attorney, Agent, or Firm* — Morgan, Lewis & Bockius LLP

(57) ABSTRACT

This application provides a speech scoring method performed by an electronic device. The method includes: receiving speech information and associated reference speech text; performing noise reduction processing on the speech information based on a speech noise reduction model to obtain noise-reduced speech information the pronunciation prediction result indicates a pronunciation similarity; performing speech recognition on the noise-reduced speech information to recognize text in the noise-reduced speech information and acoustic features associated with the speech information; and predicting a pronunciation score for indicating pronunciation similarity between the speech informa- (Continued)

Pronunciation difference processing layer 420 (PronNet)

Content difference processing layer 430 (SimilarNet)

Noise processing layer 410 (EnhanceNet)

Speech noise reduction model tion and a reference pronunciation corresponding to the reference speech text based on the recognized text and the acoustic features.

20 Claims, 13 Drawing Sheets

(56) References Cited

U.S. PATENT DOCUMENTS

| | | | | |
|---|---|---|---|---|
| 10,573,296 | B1 * | 2/2020 | Arel | G10L 15/063 |
| 11,030,991 | B2 * | 6/2021 | Chae | G10L 25/51 |
| 2003/0182119 | A1 * | 9/2003 | Junqua | G10L 15/24 704/E15.041 |
| 2005/0027523 | A1 * | 2/2005 | Tarlton | G10L 15/22 704/E15.04 |
| 2009/0319274 | A1 * | 12/2009 | Gross | G10L 17/22 704/260 |
| 2015/0016698 | A1 * | 1/2015 | Kerr | G06V 40/1376 382/125 |
| 2016/0065572 | A1 * | 3/2016 | Kim | H04L 63/0861 726/7 |
| 2018/0107815 | A1 * | 4/2018 | Wu | G10L 17/00 |
| 2018/0308491 | A1 * | 10/2018 | Oktem | G10L 15/07 |
| 2019/0114496 | A1 * | 4/2019 | Lesso | G10L 25/66 |
| 2019/0114497 | A1 * | 4/2019 | Lesso | G01S 15/58 |
| 2019/0206423 | A1 * | 7/2019 | Winton | G10L 21/0232 |
| 2019/0311722 | A1 * | 10/2019 | Caldwell | G10L 17/24 |
| 2020/0044852 | A1 * | 2/2020 | Streit | G06N 3/082 |
| 2021/0012767 | A1 | 1/2021 | Kupryjanow et al. | |
| 2021/0141896 | A1 * | 5/2021 | Streit | G06V 40/16 |
| 2021/0256104 | A1 * | 8/2021 | Tsuruga | G10L 17/24 |
| 2022/0084539 | A1 * | 3/2022 | Kagoshima | G10L 25/03 |
| 2022/0189212 | A1 * | 6/2022 | Shibata | G06V 20/52 |
| 2022/0328050 | A1 * | 10/2022 | Hennig | G10L 17/22 |
| 2022/0366916 | A1 * | 11/2022 | dos Santos | G06N 3/04 |
| 2023/0196396 | A1 * | 6/2023 | Doumar | G06Q 10/10 379/88.22 |
| 2024/0378274 | A1 * | 11/2024 | Tanski | G06F 21/32 |

FOREIGN PATENT DOCUMENTS

| | | | | | |
|---|---|---|---|---|---|
| CN | 107077860 | A | | 8/2017 | |
| CN | 108172229 | A | * | 6/2018 | G10L 17/22 |
| CN | 109448754 | A | | 3/2019 | |
| CN | 109671446 | A | | 4/2019 | |
| CN | 111429931 | A | | 7/2020 | |
| CN | 111768768 | A | | 10/2020 | |
| CN | 111883091 | A | | 11/2020 | |
| CN | 111986679 | A | | 11/2020 | |
| CN | 113053400 | A | | 6/2021 | |
| CN | 113178192 | A | | 7/2021 | |
| CN | 113284482 | A | | 8/2021 | |
| CN | 113314100 | A | | 8/2021 | |
| CN | 114283828 | A | | 4/2022 | |
| DE | 102013216427 | A1 | * | 3/2015 | G10L 15/30 |
| EP | 0892387 | A1 | * | 1/1999 | G10L 17/24 |
| FR | 3105479 | A1 | * | 6/2021 | G06V 40/70 |
| GB | 2612032 | A | * | 4/2023 | H04L 9/40 |
| JP | H0827638 | B2 | * | 3/1996 | |
| JP | 2003150194 | A | * | 5/2003 | |
| JP | 2009157050 | A | * | 7/2009 | |
| JP | 4672003 | B2 | * | 4/2011 | G10L 17/14 |
| KR | 20210017252 | A | | 2/2021 | |
| WO | WO-2006087799 | A1 | * | 8/2006 | G10L 17/14 |
| WO | WO-2008047339 | A2 | * | 4/2008 | G10L 17/06 |
| WO | WO-2020007495 | A1 | * | 1/2020 | G06F 21/32 |
| WO | WO-2023100960 | A1 | * | 6/2023 | G10L 17/14 |

OTHER PUBLICATIONS

Tencent Technology, WO, PCT/CN2022/112461, Nov. 16, 2022, 5 pgs.

Tencent Technology, IPRP, PCT/CN2022/112461, Mar. 5, 2024, 6 pgs.

* cited by examiner

SPEECH NOISE REDUCTION MODEL TRAINING METHOD AND APPARATUS, SPEECH SCORING METHOD AND APPARATUS, DEVICE, STORAGE MEDIUM, AND PROGRAM PRODUCT

CROSS-REFERENCE TO RELATED APPLICATIONS

This application is a continuation application of PCT Patent Application No. PCT/CN2022/112461, entitled "SPEECH NOISE REDUCTION MODEL TRAINING METHOD AND APPARATUS, SPEECH SCORING METHOD AND APPARATUS, DEVICE, STORAGE MEDIUM, AND PROGRAM PRODUCT" filed on Aug. 15, 2022, which claims priority to Chinese Patent Application No. 202111025632.X, entitled "SPEECH NOISE REDUCTION MODEL TRAINING METHOD AND APPARATUS, SPEECH SCORING METHOD AND APPARATUS, DEVICE, STORAGE MEDIUM, AND PROGRAM PRODUCT" filed on Sep. 2, 2021, all of which is incorporated herein by reference in its entirety.

FIELD OF THE TECHNOLOGY

This application relates to the field of artificial intelligence technologies, and in particular, to a speech noise reduction model training method and apparatus, a speech scoring method and apparatus, an electronic device, a computer-readable storage medium, and a computer program product.

BACKGROUND OF THE DISCLOSURE

Artificial intelligence (AI) is theories, methods, technologies, and application systems that simulate, extend, and expand human intelligence, perceive environments, obtain knowledge, and obtain the best results with knowledge by using digital computers or machines controlled by digital computers. In other words, artificial intelligence is a comprehensive technology in computer science and attempts to understand the essence of intelligence and produce a new intelligent machine that can react in a manner similar to human intelligence. Artificial intelligence is to study the design principles and implementation methods of various intelligent machines, to enable the machines to have the functions of perception, reasoning, and decision-making.

Artificial intelligence has been increasingly used in the field of speech processing. In related technologies, the learning goal of a speech noise reduction model is usually to make a speech waveform of a to-be-processed speech after noise reduction most similar to a speech waveform of a pure speech. In learning with the goal of being most similar to a speech waveform of a pure speech, usually only a speech with a large waveform amplitude can be paid attention to, while a speech with a small waveform amplitude is directly ignored. As a result, when a speech noise reduction model obtained through learning performs speech noise reduction processing, there is a problem of losing speech information, and the noise reduction effect is poor.

SUMMARY

Embodiments of this application provide a speech noise reduction model training method and apparatus, an electronic device, a computer-readable storage medium, and a computer program product, which can improve the precision of speech noise reduction processing and the speech noise reduction effect.

Technical solutions in the embodiments of this application are implemented as follows:

An embodiment of this application provides a speech noise reduction model training method, performed by an electronic device, where a speech noise reduction model includes: a noise processing layer, a pronunciation difference processing layer, and a content difference processing layer, and the method includes:

performing noise reduction processing on a speech sample through the noise processing layer, to obtain a target speech sample;

predicting the target speech sample through the pronunciation difference processing layer, to obtain a pronunciation prediction result, wherein the pronunciation prediction result indicates a pronunciation similarity between the target speech sample and a reference pronunciation corresponding to the speech sample;

determining a content difference between content of the target speech sample and content of the speech sample through the content difference processing layer; and updating the speech noise reduction model based on the pronunciation prediction result and the content difference, to obtain a trained speech noise reduction model.

An embodiment of this application further provides a speech scoring method, performed by an electronic device using the aforementioned speech noise reduction model. The method includes:

receiving speech information and associated reference speech text;

performing noise reduction processing on the speech information based on the speech noise reduction model to obtain noise-reduced speech information;

performing speech recognition on the noise-reduced speech information to recognize text in the noise-reduced speech information and acoustic features associated with the speech information; and predicting a pronunciation score for indicating pronunciation similarity between the speech information and a reference pronunciation corresponding to the reference speech text based on the recognized text and the acoustic features.

An embodiment of this application further provides an electronic device, including:

a memory, configured to store a computer executable instruction; and a processor, configured to execute the computer executable instruction stored in the memory and cause the electronic device to perform the aforementioned method according to the embodiments of this application.

An embodiment of this application further provides a non-transitory computer-readable storage medium, storing a computer executable instruction, the computer executable instruction being executed by a processor of an electronic device and causing the electronic device to implement the aforementioned methods according to the embodiments of this application.

An embodiment of this application further provides a computer program product, including a computer program or a computer executable instruction, the computer program or the computer executable instruction being executed by a processor to implement the method according to the embodiments of this application.

The embodiments of this application have the following beneficial effects:

In application of the embodiments of this application, the pronunciation difference processing layer and the content difference processing layer are added in the speech noise reduction model, after the noise processing layer of the speech noise reduction model performs noise reduction processing on the speech sample, the pronunciation difference processing layer predicts the target speech sample obtained by the noise reduction processing, to obtain the pronunciation prediction result for indicating the pronunciation similarity between the target speech sample and the reference pronunciation corresponding to the speech sample, and the content difference processing layer determines the content difference between the content of the target speech sample and the content of the speech sample, so that the model parameter of the speech noise reduction model is updated based on the pronunciation prediction result and the content difference, to obtain the trained speech noise reduction model. In this way, the speech noise reduction model is obtained through training based on the pronunciation similarity between the speech before the noise reduction processing and the speech after the noise reduction processing, and the content difference between the speech before the noise reduction processing and the speech after the noise reduction processing. This reduces the impact of the loss of speech information before and after the noise reduction processing on model training, and improves the training effect of the speech noise reduction model. When the speech noise reduction model performs speech noise reduction processing, the loss of speech information before and after the noise reduction processing can be reduced, and the precision of the speech noise reduction processing and the speech noise reduction effect can be improved.

DESCRIPTION OF EMBODIMENTS

Figure 1:
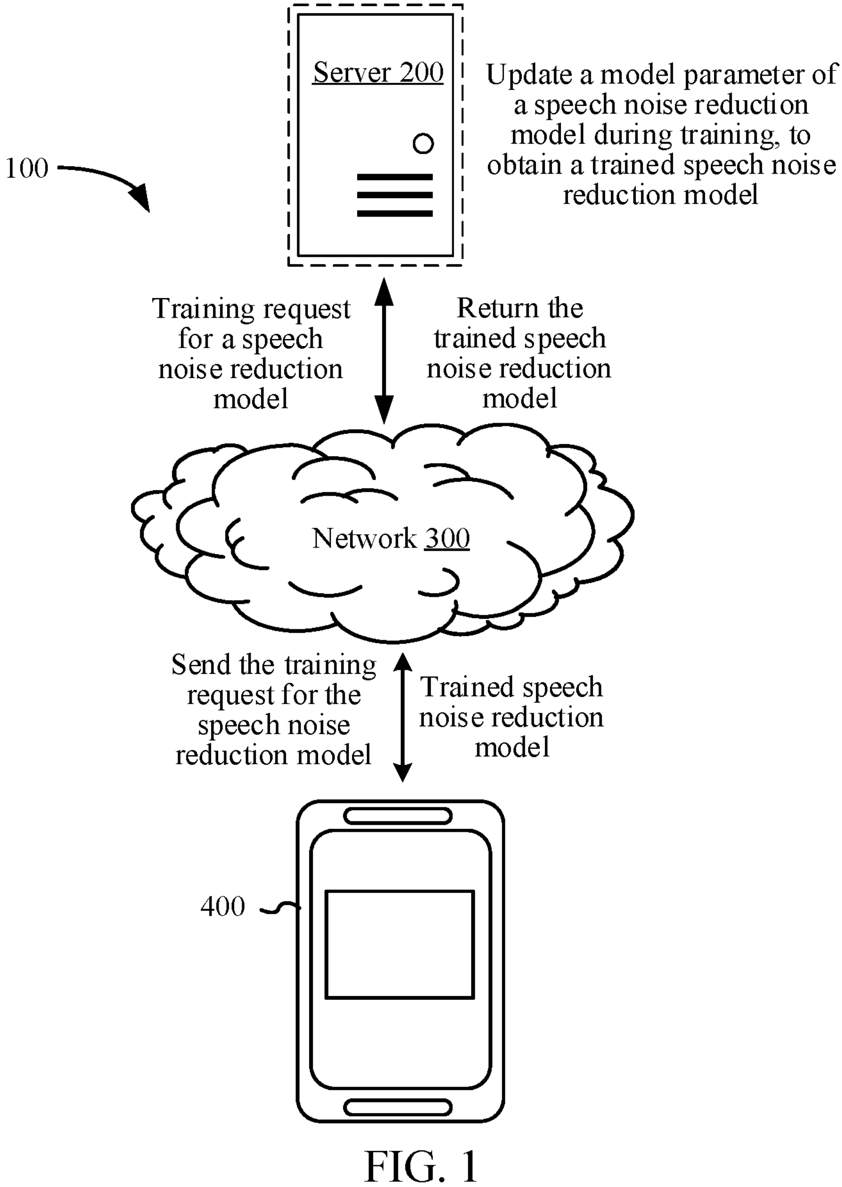
FIG. 1 is a schematic architectural diagram of a speech noise reduction model training system 100 according to an embodiment of this application.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following description, the term "some embodiments" describes subsets of all possible embodiments, but it may be understood that "some embodiments" may be the same subset or different subsets of all the possible embodiments, and can be combined with each other without conflict.

In the following description, the term "first/second/third" is only used to distinguish similar objects and does not represent a specific sequence of objects. It is understood that "first/second/third" can be interchanged if allowed, so that the embodiments of this application described herein can be implemented in a sequence other than that illustrated or described herein.

Unless otherwise defined, meanings of all technical and scientific terms used in this specification are the same as those usually understood by a person skilled in the art to which this application belongs. The terms used herein are only for the purpose of describing embodiments of this application and are not intended to limit this application.

Before the embodiments of this application are further described in detail, a description is made on nouns and terms in the embodiments of this application, and the nouns and terms in the embodiments of this application are applicable to the following explanations.

(1) Client: application program running in a terminal to provide various services, such as a client supporting pronunciation scoring.

(2) In response to: used to indicate a condition or a state on which an operation to be executed depends. When the condition or state on which an operation to be executed depends is satisfied, one or more operations to be executed may be performed in real time or with a specified delay. Unless otherwise specified, there is no restriction on the sequence in which multiple operations to be executed are performed.

(3) Convolutional Neural Networks (CNN): a type of feed forward neural network that includes convolution calculation and has a deep structure, and one of representative algorithms for deep learning. The convolutional neural network is constructed by imitating the biological visual perception mechanism, and can perform supervised learning and unsupervised learning, and is characterized by intra-layer convolution kernel parameter sharing and inter-layer connection sparsity, so that the convolutional neural network can learn gridded features (such as pixels and audio) based on a small amount of computation, and has the stable effect and has no additional feature engineering requirement on data.

(4) Time delay neural network (TDNN): it is a convolutional neural network applied to speech recognition, a speech signal preprocessed by fast Fourier transform (FFT) is used as an input, and a hidden layer thereof includes 2 one-dimensional convolution kernels to extract translation-invariant features in frequency domain.

(5) The short-time Fourier transform (STFT): it is a mathematical transform related to Fourier transform, and is used to determine a frequency and a phase of a sine wave in a local area of a time-varying signal.

(6) The inverse short-time Fourier transform (iSTFT): the inverse processing of the short-time Fourier transform.

Based on the above explanations of the nouns and terms involved in the embodiments of this application, the speech noise reduction model training system provided by the embodiments of this application will be described below. Referring to FIG. 1, FIG. 1 is a schematic architectural diagram of a speech noise reduction model training system 100 according to an embodiment of this application. To support an exemplary application, a terminal 400 is connected to a server 200 through a network 300, the network 300 may be a wide area network or a local area network, or a combination thereof, and data transmission is performed through a wireless or wired link.

The terminal 400 is configured to: in response to a training instruction for a speech noise reduction model, send a training request corresponding to the speech noise reduction model to the server 200. The speech noise reduction model includes: a noise processing layer; a pronunciation difference processing layer; and a content difference processing layer.

The server 200 is configured to receive and respond to the training request, and perform noise reduction processing on a speech sample through the noise processing layer, to obtain a target speech sample; predict the target speech sample through the pronunciation difference processing layer, to obtain a pronunciation prediction result, where the pronunciation prediction result indicates a pronunciation similarity between the target speech sample and a reference pronunciation corresponding to the speech sample; determine a content difference between content of the target speech sample and content of the speech sample through the content difference processing layer; update a model parameter of the speech noise reduction model based on the pronunciation prediction result and the content difference, to obtain a trained speech noise reduction model; and return the trained speech noise reduction model to the terminal 400.

The terminal 400 is configured to receive the trained speech noise reduction model, and perform speech noise reduction processing on entered speech information based on the speech noise reduction model, thereby reducing the loss of speech information before and after the noise reduction processing, and improving the precision of speech noise reduction processing.

In practical application, the server 200 can be an independent physical server, or a server cluster including multiple physical servers, or a distributed system, and can also be a cloud server that provides basic cloud computing services such as cloud services, cloud databases, cloud computing, cloud functions, cloud storage, network services, cloud communications, middleware services, domain name services, security services, CDN, and big data and artificial intelligence platforms. The terminal 400 may be a smartphone, a tablet computer, a notebook computer, a desktop computer, a smart speaker, a smart TV, a smartwatch, or the like, but is not limited thereto. The terminal 400 and the server 200 may be connected directly or indirectly through wired or wireless communication, which is not limited in this application.

Figure 2:
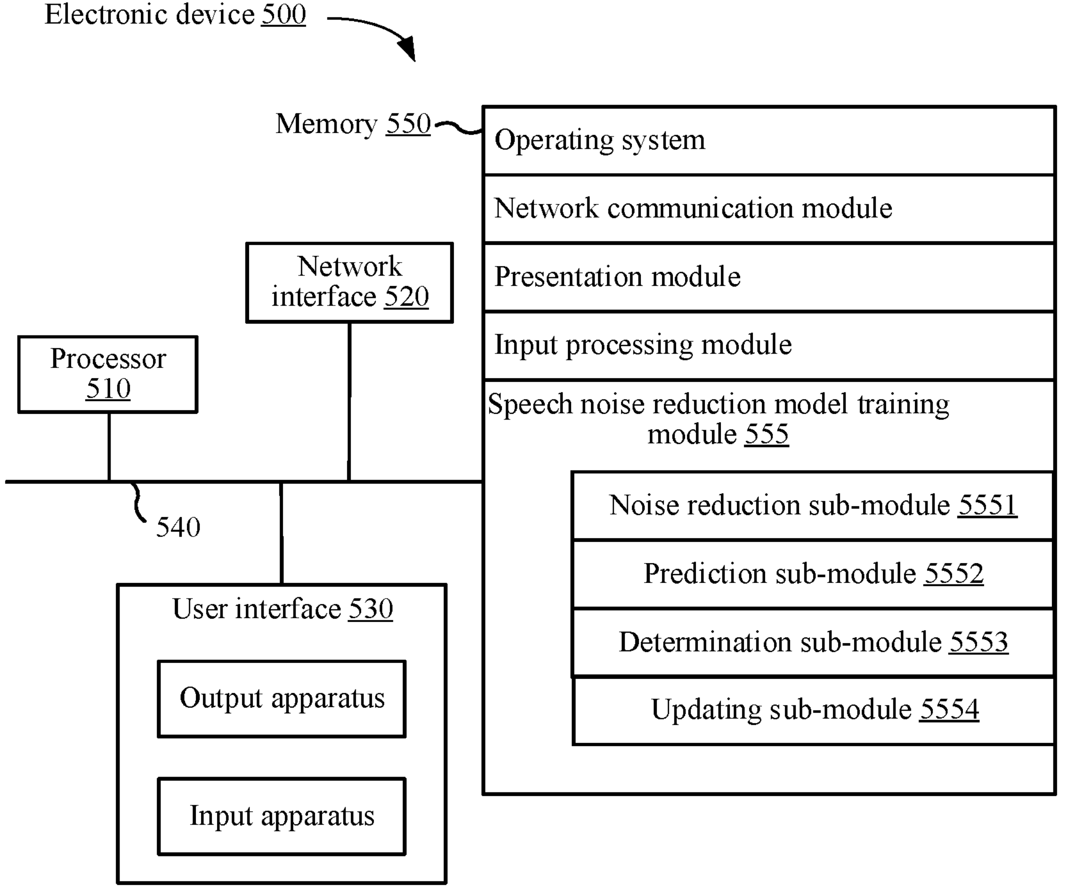
FIG. 2 is a schematic structural diagram of an electronic device implementing a speech noise reduction model training method according to an embodiment of this application.

Referring to FIG. 2, FIG. 2 is a schematic structural diagram of an electronic device 500 implementing a speech noise reduction model training method according to an embodiment of this application. In practical application, the electronic device 500 may be the server or the terminal shown in FIG. 1. For example, the electronic device 500 is the terminal shown in FIG. 1, to describe an electronic device implementing a speech noise reduction model training method in the embodiments of this application. The electronic device 500 provided in the embodiments of this application includes: at least one processor 510, a memory 550, at least one network interface 520, and a user interface 530. All components of the electronic device 500 are coupled by using a bus system 540. It may be understood that, the bus system 540 is configured to implement connection and communication between the components. In addition to a data bus, the bus system 540 further includes a power bus, a control bus, and a state signal bus. But, for ease of clear description, all types of buses in FIG. 2 are marked as the bus system 540.

In some embodiments, a speech noise reduction model training module provided by the embodiments of this application can be implemented by software. FIG. 2 shows a speech noise reduction model training module 555 stored in the memory 550. The apparatus can be software in a form of program and plug-in and includes the following software modules: a noise reduction sub-module 5551, a prediction sub-module 5552, a determination sub-module 5553, and an updating sub-module 5554, where these modules are logical and therefore can be combined arbitrarily or further divided according to functions to be performed, and functions of the modules will be explained below.

Based on the above description of the speech noise reduction model training system and the electronic device provided in the embodiments of this application, the speech noise reduction model training method provided in the embodiments of this application will be described below. In some embodiments, the speech noise reduction model training method provided by the embodiments of this application can be implemented separately by the server or the terminal, or jointly implemented by the server and the terminal. The following uses the implementation of the server as an example to illustrate the speech noise reduction model training method provided by the embodiments of this application.

Figure 3:
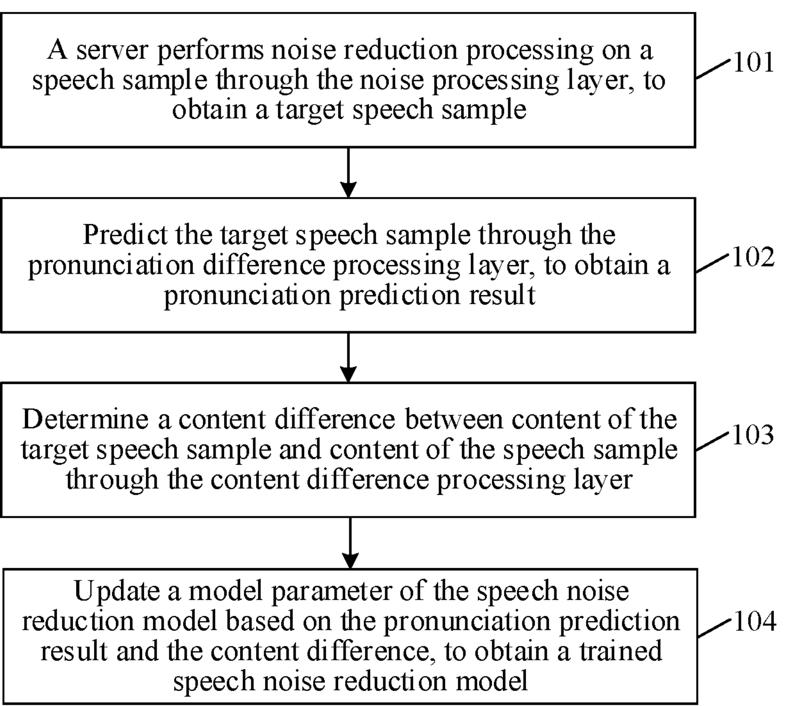
FIG. 3 is a schematic flowchart of a speech noise reduction model training method according to an embodiment of this application.

Referring to FIG. 3, FIG. 3 is a schematic flowchart of a speech noise reduction model training method according to an embodiment of this application. A speech noise reduction model provided by the embodiments of this application includes: a noise processing layer, a pronunciation difference processing layer, and a content difference processing layer, and the speech noise reduction model training method provided in the embodiments of this application includes:

Step 101: A server performs noise reduction processing on a speech sample through the noise processing layer, to obtain a target speech sample.

Figure 4:
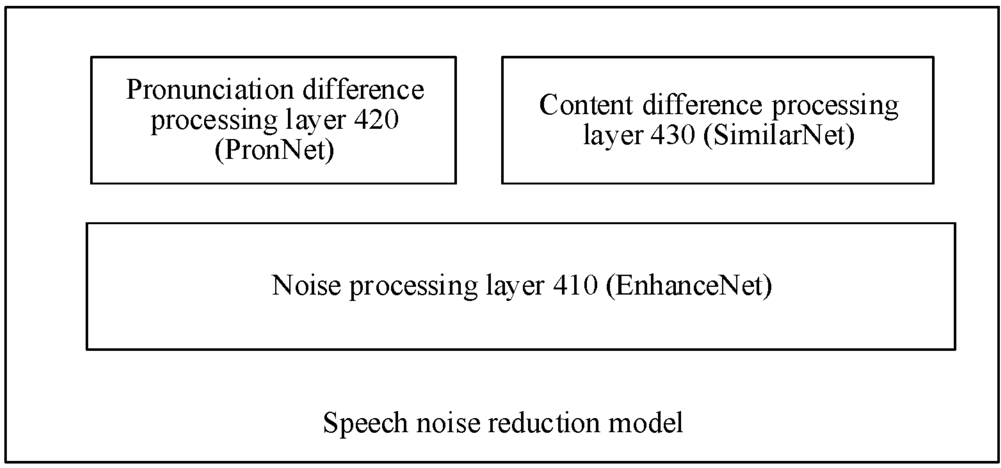
FIG. 4 is a schematic structural diagram of a speech noise reduction model according to an embodiment of this application.

Herein, the speech noise reduction model includes a noise processing layer, a pronunciation difference processing layer, and a content difference processing layer, and the speech noise reduction model is configured to perform speech noise reduction processing on entered speech information. As an example, referring to FIG. 4, FIG. 4 is a schematic structural diagram of a speech noise reduction model according to an embodiment of this application. Herein, the speech noise reduction model includes a noise processing layer 410 (that is, a speech enhancement network EnhanceNet), a pronunciation difference processing layer 420 (that is, a pronunciation error prediction network PronNet), and a content difference processing layer 430 (that is, a speech similarity measurement network SimilarNet).

In practical application, the speech noise reduction model can be constructed based on machine learning networks, such as convolutional neural networks and deep neural networks. After the initial speech noise reduction model is constructed based on machine learning networks, the speech noise reduction model includes initial model parameters. To improve the noise reduction effect of the speech noise reduction model, it is necessary to train the initially constructed speech noise reduction model. In the process of model training, a model parameter of the speech noise reduction model is updated to obtain a trained speech noise reduction model, so that noise reduction processing is performed on speech information based on the trained speech noise reduction model.

In the process of training the speech noise reduction model, a training sample for training, that is, a speech sample, is first obtained. The speech sample may be for a reference speech text, and the reference speech text corresponds to a reference pronunciation. After obtaining the speech sample for training the speech noise reduction model, the server performs noise reduction processing on the speech sample through the noise processing layer of the speech noise reduction model, such as filtering noise reduction processing, to obtain a target speech sample.

In some embodiments, the noise processing layer includes: a first feature transform layer, a filtering processing layer, and a second feature transform layer. The step 101 shown in FIG. 3 can be performed through step 201 to step 203: Step 201: Perform Fourier transform on the speech sample through the first feature transform layer, to obtain an amplitude spectrum and a phase spectrum of the speech sample. Step 202: Filter the magnitude spectrum through the filtering processing layer to obtain a target magnitude spectrum, and perform phase correction on the phase spectrum to obtain a target phase spectrum. Step 203: Multiply the target magnitude spectrum and the target phase spectrum through the second feature transform layer, and perform inverse Fourier transform on a multiplication result, to obtain the target speech sample.

Figure 5:
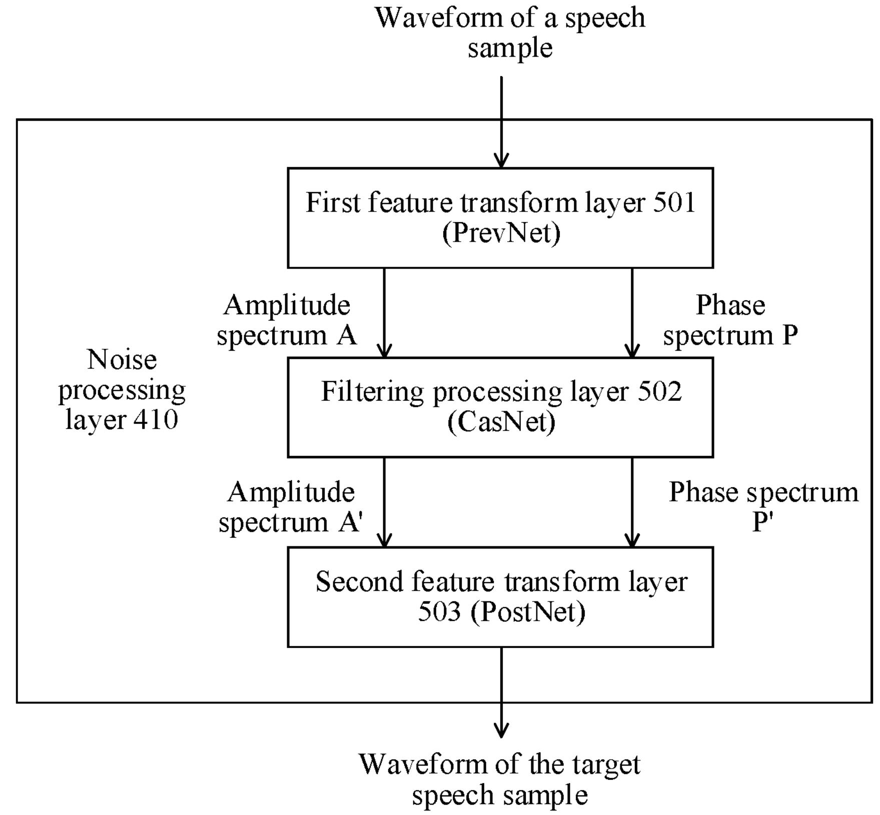
FIG. 5 is a schematic structural diagram of a noise processing layer according to an embodiment of this application.

Herein, the noise processing layer includes a first feature transform layer, a filtering processing layer, and a second feature transform layer. As an example, referring to FIG. 5, FIG. 5 is a schematic structural diagram of a noise processing layer according to an embodiment of this application. Herein, the noise processing layer 410 is the speech enhancement network EnhanceNet shown in FIG. 4, and includes a first feature transform layer 501 (that is, a pre-processing network PrevNet), a filtering processing layer 502 (that is, an activation network CasNet), and a second feature transform layer 503 (that is, a post-processing network PostNet). In practical application, first, Fourier transform is performed on a waveform feature of the speech sample through the first feature transform layer 501, to obtain a corresponding amplitude spectrum A and a corresponding phase spectrum P. Then, the amplitude spectrum A is filtered through the filtering processing layer 502, to obtain an amplitude spectrum A' (that is, the target amplitude spectrum), and at the same time, phase correction is performed on the phase spectrum P through the filtering processing layer 502 based on the filtered amplitude spectrum A', to obtain a phase spectrum P' (that is, the target phase spectrum). Finally, the amplitude spectrum A' and the phase spectrum P' are multiplied through the second feature transform layer 503, Fourier inverse transform processing is performed on a multiplication result, and a waveform of the target speech sample is output. In this way, noise reduction processing is performed on a speech sample through the noise processing layer to obtain a target speech sample.

Figure 6:
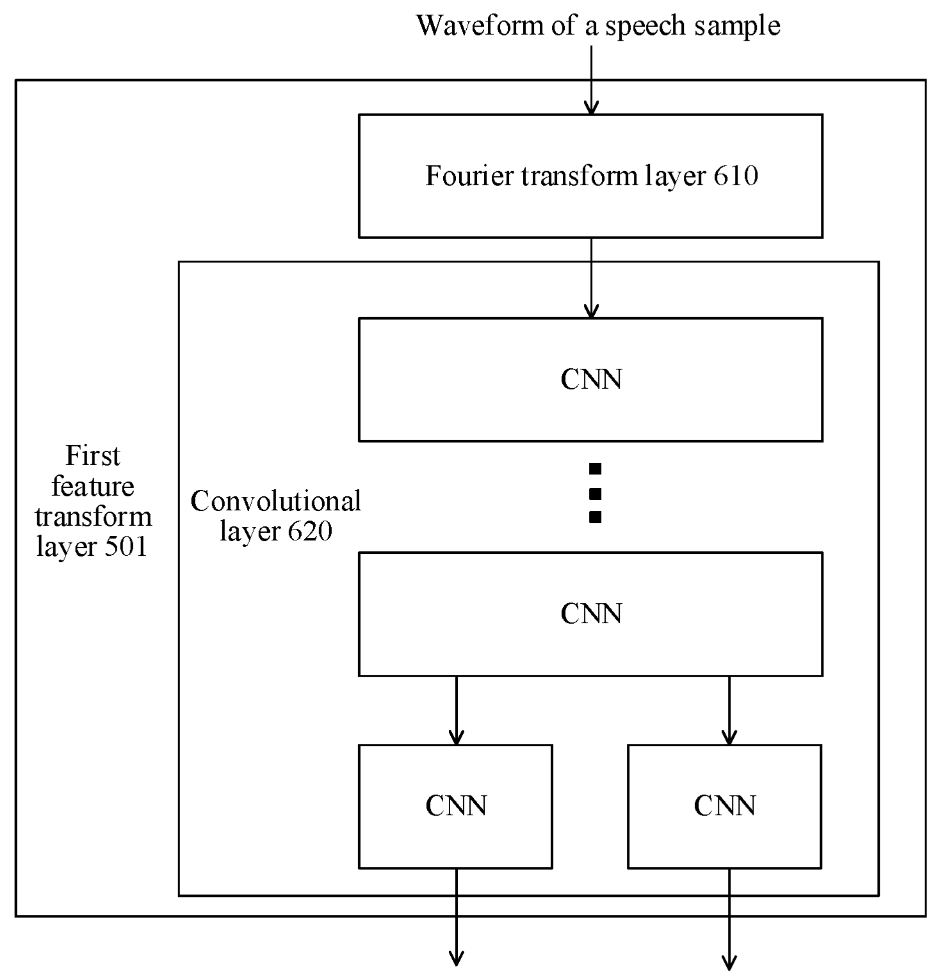
FIG. 6 is a schematic structural diagram of a first feature transform layer according to an embodiment of this application.

Next, a processing process of the noise reduction processing layer will be described in detail. In step 201, the server performs Fourier transform on the speech sample through the first feature transform layer, which is specifically performing Fourier transform on the waveform feature of the speech sample to obtain the amplitude spectrum and the phase spectrum of the speech sample. As an example, referring to FIG. 6, FIG. 6 is a schematic structural diagram of a first feature transform layer according to an embodiment of this application. Herein, the first feature transform layer 501 is the pre-processing network PrevNet shown in FIG. 5, and includes a Fourier transform layer 610 and a convolutional layer 620 (including multiple CNNs). Fourier transform (for example, short-time Fourier transform) is performed to convert the waveform feature of the speech sample into a 2-channel Fourier spectrum (including a Fourier magnitude spectrum and a Fourier phase spectrum) through the Fourier transform layer 610, and the 2-channel Fourier spectrum can be converted into a 64-channel amplitude spectrum A and a 64-channel phase spectrum P respectively through the convolutional layer 620.

In step 202, the server performs filtering processing (that is, noise reduction processing) on the magnitude spectrum through the filtering processing layer, such as convolution filtering processing, to obtain the target magnitude spectrum. At the same time, phase correction is performed on the phase spectrum through the filtering processing layer based on the target magnitude spectrum, to obtain the target phase spectrum. In some embodiments, the filter processing layer includes at least two cascaded filtering processing sublayers. The server can filter the magnitude spectrum through the filtering processing layer to obtain a target magnitude spectrum, and perform phase correction on the phase spectrum to obtain a target phase spectrum in the following manner: filtering the magnitude spectrum through a first-level filtering processing sub-layer to obtain an intermediate magnitude spectrum, and perform phase correction on the phase spectrum to obtain an intermediate phase spectrum; and filtering the intermediate magnitude spectrum through the non-first-level filtering processing sub-layer to obtain a target magnitude spectrum, and performing phase correction on the intermediate phase spectrum to obtain a target phase spectrum.

The number of filtering processing sub-layers is N (N is an integer greater than 1), and the server can obtain the target phase spectrum of the target amplitude spectrum in the following manner: The amplitude spectrum is filtered through the first filtering processing sub-layer (that is, the first-level filtering processing sub-layer) of N filtering processing sub-layers, to obtain the intermediate amplitude spectrum of the first filtering processing sub-layer, and phase correction is performed on the phase spectrum, to obtain the intermediate phase spectrum of the first filtering processing sub-layer. An intermediate amplitude spectrum output by the $(i-1)^{th}$ filtering processing sub-layer is filtered through the $i^{th}$ (i is an integer greater than 1 and i is less than or equal to N) filtering processing sub-layer (that is, the non-first-level filtering processing sub-layer) of the N filtering processing sub-layers, to obtain the intermediate amplitude spectrum of the $i^{th}$ filtering processing sub-layer, and phase correction is performed on the intermediate phase spectrum output by the $(i-1)^{th}$ filtering processing sub-layer, to obtain the intermediate phase spectrum of the $i^{th}$ filtering processing sub-layer. i is traversed to obtain the intermediate phase spectrum of the intermediate amplitude spectrum output by the $N^{th}$ filtering processing sub-layer, the intermediate amplitude spectrum output by the $N^{th}$ filtering processing sub-layer is used as the target amplitude spectrum, and the intermediate phase spectrum output by the $N^{th}$ filtering processing sub-layer is used as the target phase spectrum.

Figure 7:
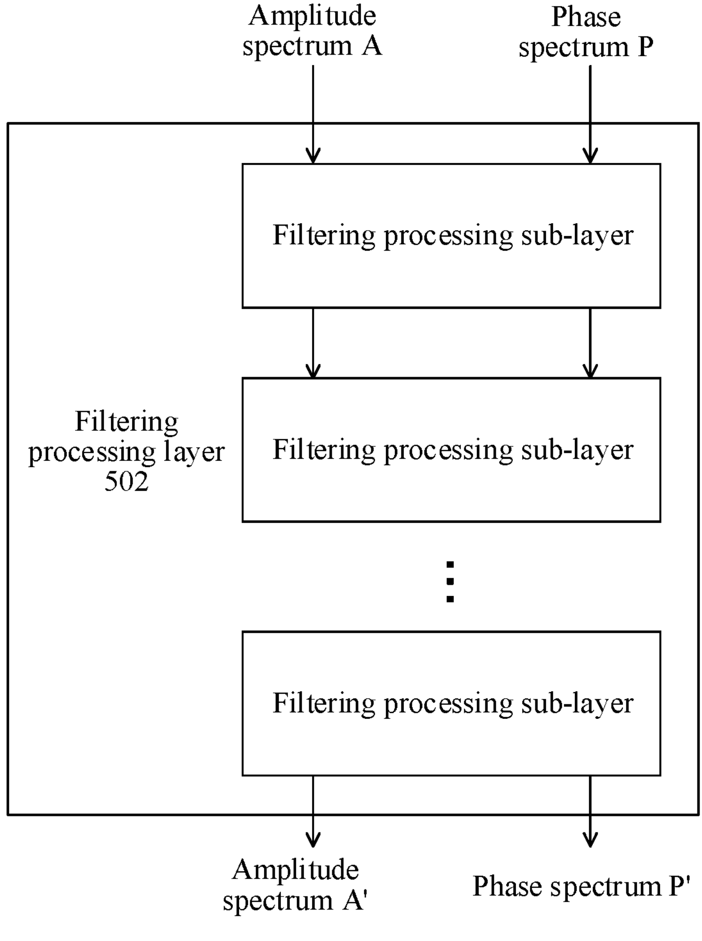
FIG. 7 is a schematic structural diagram of a filtering processing layer according to an embodiment of this application.

As an example, referring to FIG. 7, FIG. 7 is a schematic structural diagram of a filtering processing layer according to an embodiment of this application. Herein, the filtering processing layer 502 includes multiple filtering processing sub-layers, and each filtering processing sub-layer can include a third-order activation attention network. The amplitude spectrum A and the phase spectrum P output by the first feature transform layer 501 are filtered, to output a 64-channel amplitude spectrum A' (that is, the target amplitude spectrum) and a 64-channel phase spectrum P' (that is, the target phase spectrum).

In some embodiments, each filtering processing sub-layer includes a phase spectrum correction layer, and at least two cascaded amplitude spectrum filtering layers. The server can filter the magnitude spectrum through a first-level filtering processing sub-layer to obtain an intermediate magnitude spectrum, and perform phase correction on the phase spectrum to obtain an intermediate phase spectrum in the following manner: performing filtering processing on the amplitude spectrum through the at least two cascaded amplitude spectrum filtering layers, to obtain the intermediate amplitude spectrum; and performing phase correction on the phase spectrum through the phase spectrum correction layer based on the intermediate amplitude spectrum, to obtain the intermediate phase spectrum.

Herein, each filtering processing sub-layer includes a phase spectrum correction layer and at least two cascaded amplitude spectrum filtering layers. The server may first filter the amplitude spectrum through the at least two cascaded amplitude spectrum filtering layers, such as perform harmonic filtering, to obtain the intermediate amplitude spectrum. Then, the server performs phase correction on the phase spectrum through the phase spectrum correction layer based on the intermediate amplitude spectrum, to obtain the intermediate phase spectrum. In practical application, the relationship between the intermediate magnitude spectrum and the intermediate phase spectrum is:

$$P'' = P \circ \mathrm{Tanh}(Conv(A'' \oplus P));$$

Conv( ) is convolution operation; Tanh( ) is Hyperbolic tangent function operation (which converts an input value into a value between −1 and 1); $\circ$ indicates dot multiplication, $\oplus$ indicates splicing, A" indicates the intermediate amplitude spectrum, P indicates phase spectrum, and P" indicates the intermediate phase spectrum.

Figure 8:
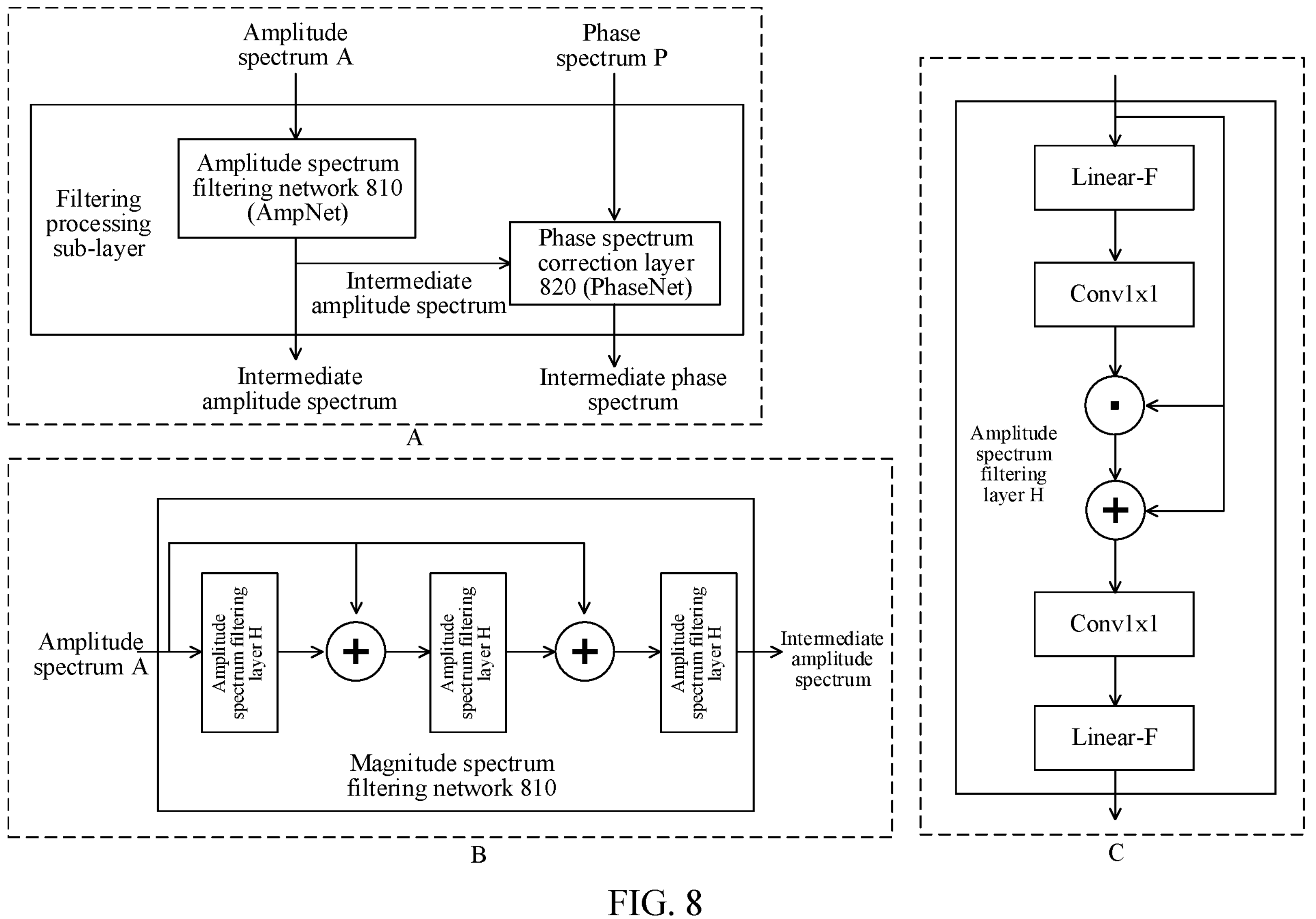
FIG. 8 is a schematic structural diagram of a filtering processing sublayer according to an embodiment of this application.

As an example, referring to FIG. 8, FIG. 8 is a schematic structural diagram of a filtering processing sub-layer according to an embodiment of this application. Herein, (1) as shown in FIG. A in FIG. 8, the filtering processing sub-layer includes an amplitude spectrum filtering network 810 (that is, the amplitude spectrum enhancement network AmpNet) and a phase spectrum correction layer 820 (that is, the phase spectrum correction network PhaseNet), and the magnitude spectrum filtering network 810 is configured to filter the magnitude spectrum A to obtain an intermediate magnitude spectrum. (2) As shown in FIG. B in FIG. 8, the amplitude spectrum filtering network 810 includes three cascaded amplitude spectrum filtering layers (that is, harmonic enhancers H). (3) A schematic structural diagram of each amplitude spectrum filtering layer is shown in FIG. C in FIG. 8. The amplitude spectrum filtering layer includes two linear processing layers Linear-F and two convolutional layers Conv1*1. The amplitude spectrum filtering layer is configured to perform harmonic filtering processing on the amplitude spectrum.

In step 203, the server multiplies the target magnitude spectrum and the target phase spectrum through the second feature transform layer. In practical application, a dot product of the target magnitude spectrum and the target phase spectrum can be calculated, so that inverse Fourier transform is performed on a multiplication result to obtain the target speech sample.

In some embodiments, the second feature transform layer includes a feature conversion layer and a feature inverse transform layer. The server can multiply the target magnitude spectrum and the target phase spectrum through the second feature transform layer, and perform inverse Fourier transform on a multiplication result, to obtain the target speech sample in the following manner: converting the target magnitude spectrum into a magnitude spectrum mask through the feature conversion layer, and determining a phase angle corresponding to the target phase spectrum; and multiplying, through the feature inverse transform layer, the target magnitude spectrum, the magnitude spectrum mask, and the phase angle corresponding to the target phase spectrum, and performing inverse Fourier transform on a multiplication result, to obtain the target speech sample.

In practical application, the second feature transform layer includes a feature conversion layer and a feature inverse transform layer. Specifically, The server may convert the target magnitude spectrum into a magnitude spectrum mask through the feature conversion layer, and determine a phase angle corresponding to the target phase spectrum; and multiply, through the feature inverse transform layer, the target magnitude spectrum, the magnitude spectrum mask, and the phase angle corresponding to the target phase spectrum, and perform inverse Fourier transform on a multiplication result, to obtain the target speech sample.

Figure 9:
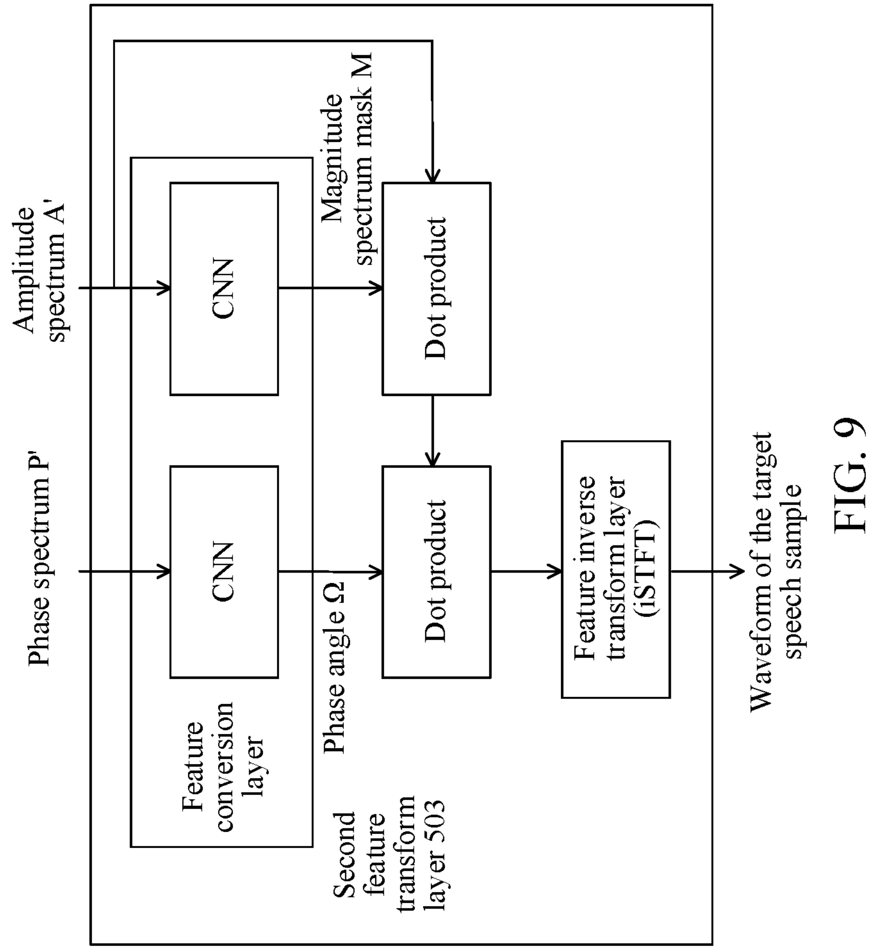
FIG. 9 is a schematic structural diagram of a second feature transform layer according to an embodiment of this application.

As an example, referring to FIG. 9, FIG. 9 is a schematic structural diagram of a second feature transform layer according to an embodiment of this application. Herein, the second feature transform layer 503 includes a feature conversion layer, and the feature conversion layer includes multiple convolutional neural networks (CNN). The second feature transform layer 503 also includes a feature inverse transform layer. The target amplitude spectrum (that is, the amplitude spectrum A') output by the filtering processing layer 502 is converted into a magnitude spectrum mask M, the target phase spectrum (that is, the phase spectrum P') is converted into a phase angle Ω, and then Fourier inverse transform is performed to convert into a waveform for output, that is, the target speech sample after noise reduction is obtained. Specifically, Dot product calculation is performed on the phase angle Ω and a dot product result of the target amplitude spectrum and the amplitude spectrum mask, and then inverse short-time Fourier transform (iSTFT) is performed on the obtained result to convert into a waveform for output, that is, the target speech sample after noise reduction is obtained.

In application of the above-mentioned embodiments, the noise processing layer that integrates and promotes spectral harmonic information, phase information, and amplitude information is proposed. When noise reduction processing is performed on the speech sample based on the noise processing layer, the loss of speech information can be reduced and the speech noise reduction effect can be improved.

Step 102: Predict the target speech sample through the pronunciation difference processing layer, to obtain a pronunciation prediction result.

The pronunciation prediction result is used to indicate pronunciation similarity between the target speech sample and a reference pronunciation corresponding to the speech sample.

Herein, the target speech sample is a speech sample after noise reduction processing. The target speech sample is predicted through the pronunciation difference processing layer to obtain the pronunciation prediction result. The pronunciation prediction result is used to indicate pronunciation similarity between the target speech sample and a reference pronunciation corresponding to the speech sample. For example, the pronunciation score of the target speech sample is predicted through the pronunciation difference processing layer, and the pronunciation prediction result is a predicted pronunciation score.

In some embodiments, the pronunciation difference processing layer further includes: a first feature mapping layer, a second feature mapping layer, and a feature splicing and prediction layer, where a network structure of the first feature mapping layer is different from a network structure of the second feature mapping layer. The server can predict the target speech sample through the pronunciation difference processing layer, to obtain the pronunciation prediction result in the following manner: performing mapping processing on the target speech sample through the first feature mapping layer, to obtain a first mapping feature; performing mapping processing on the target speech sample through the second feature mapping layer, to obtain a second mapping feature; and performing splicing processing on the first mapping feature and the second mapping feature through the feature splicing and prediction layer, to obtain a spliced feature; and predicting the spliced feature to obtain the pronunciation prediction result.

In practical application, the first feature mapping layer may be constructed based on a transformer network, and the second feature mapping layer may be constructed based on a TDNN network. In this way, the speech feature of the target speech sample can be extracted more accurately, thereby improving the accuracy of the pronunciation prediction result, and improving the training effect of model training when performing model training based on the pronunciation prediction result.

Step 103: Determine a content difference between content of the target speech sample and content of the speech sample through the content difference processing layer.

After the pronunciation prediction result corresponding to the target speech sample is predicted through the pronunciation difference processing layer, the content difference between the content of the target speech sample and the content of the speech sample is determined through the content difference processing layer. Herein, the content difference may mainly include a difference in the amount of speech information.

In some embodiments, the content difference processing layer includes: a Fourier transform layer. The server can determine the content difference between the content of the target speech sample and the content of the speech sample through the content difference processing layer in the following manner: performing Fourier transform on the target speech sample through the Fourier transform layer, to obtain a first magnitude spectrum, and performing Fourier transform on the speech sample, to obtain a second magnitude spectrum; and determining a magnitude difference between the first magnitude spectrum and the second magnitude spectrum, and determining the magnitude difference as the content difference between the content of the target speech sample and the content of the speech sample.

Herein, the content difference processing layer includes: a Fourier transform layer. The server may perform Fourier transform on the target speech sample through the Fourier transform layer, to obtain a first magnitude spectrum, and perform Fourier transform on the speech sample, to obtain a second magnitude spectrum. The server determines the amplitude difference between the first amplitude spectrum and the second amplitude spectrum. In practical application, the server may calculate a first average amplitude of the first amplitude spectrum and calculate a second average amplitude of the second amplitude spectrum, and then use a magnitude difference between the first average magnitude and the second average magnitude as the magnitude difference between the first magnitude spectrum and the second magnitude spectrum. Therefore, the amplitude difference between the first amplitude spectrum and the second amplitude spectrum is determined as the content difference between the content of the target speech sample and the content of the speech sample.

In some embodiments, the Fourier transform layer includes at least two Fourier transform sub-layers, and different Fourier transform sub-layers correspond to different transform scales. The server may perform Fourier transform on the target speech sample through the Fourier transform layer, to obtain a first magnitude spectrum, and perform Fourier transform on the speech sample, to obtain a second magnitude spectrum in the following manner: performing Fourier transform of a corresponding transform scale on the target speech sample through each of the Fourier transform sub-layers, to obtain the first amplitude spectrum corresponding to each of the Fourier transform sub-layers; and performing Fourier transform of a corresponding transform scale on the speech sample through each of the Fourier transform sub-layers, to obtain the second amplitude spectrum corresponding to each of the Fourier transform sub-layers.

Correspondingly, the server may determine the amplitude difference between the first amplitude spectrum and the second amplitude spectrum in the following manner: determining an intermediate amplitude difference between the first amplitude spectrum and the second amplitude spectrum corresponding to each of the Fourier transform sub-layers; and performing summing and averaging processing on intermediate amplitude differences corresponding to the at least two Fourier transform sub-layers, to obtain an average amplitude difference, and using the average amplitude difference as the amplitude difference.

In some embodiments, the content difference processing layer further includes: a power compression processing layer. The server may determine the amplitude difference between the first amplitude spectrum and the second amplitude spectrum in the following manner: performing compression processing on the first amplitude spectrum through the power compression processing layer, to obtain a first compressed amplitude spectrum, and performing compression processing on the second amplitude spectrum, to obtain a second compressed amplitude spectrum; and determining a compressed magnitude difference between the first compressed magnitude spectrum and the second compressed magnitude spectrum, and using the compressed magnitude difference as the magnitude difference. In practical application, the server may determine a third average amplitude of the first compressed amplitude spectrum and determine a fourth average amplitude of the second compressed amplitude spectrum, then determine an amplitude difference between the third average amplitude and the fourth average amplitude, and determine the magnitude difference as the compressed magnitude difference between the first compressed magnitude spectrum and the second compressed magnitude spectrum.

Figure 10:
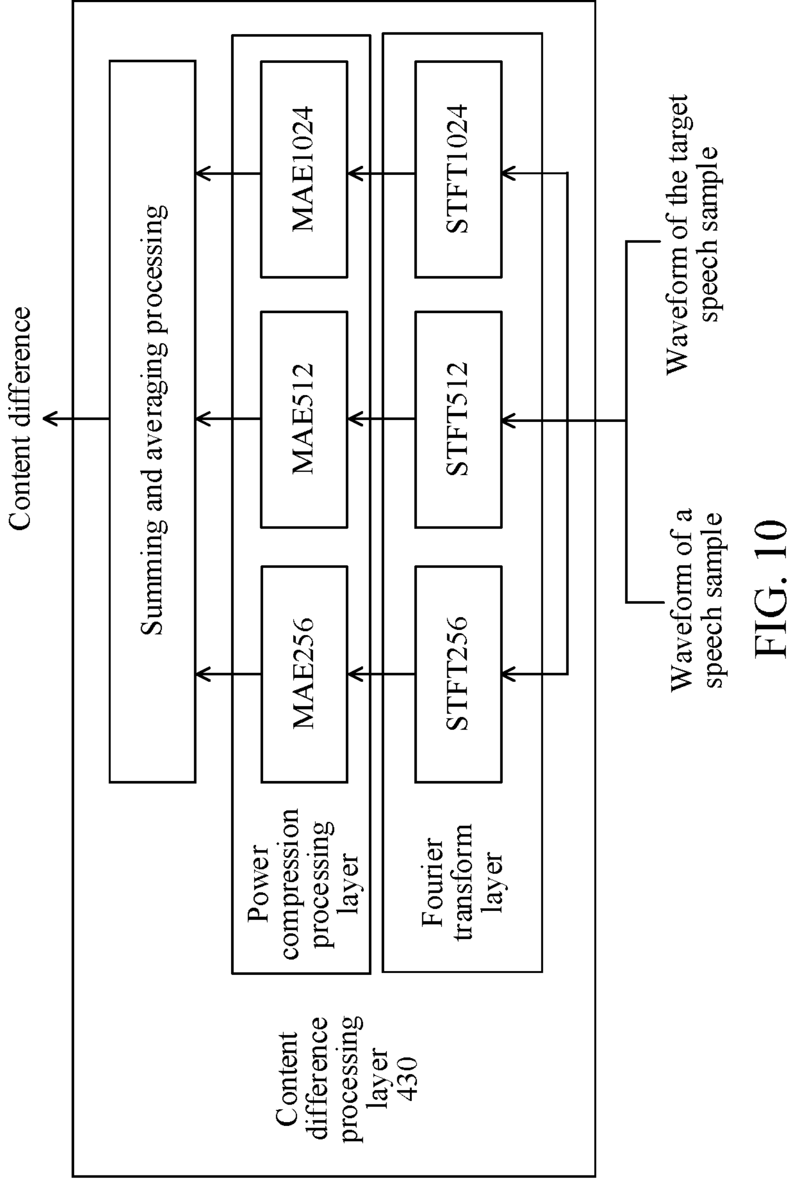
FIG. 10 is a schematic structural diagram of a content difference processing layer according to an embodiment of this application.

As an example, referring to FIG. 10, FIG. 10 is a schematic structural diagram of a content difference processing layer according to an embodiment of this application. Herein, the content difference processing layer 430 includes Fourier transform layers of three scales: STFT256, STFT512, and STFT1024, and a power compression processing layer corresponding to a Fourier transform layer of each scale: MAE256 (corresponding to STFT256), MAE512 (corresponding to STFT512), and MAE1024 (corresponding to STFT1024). Analysis window sizes of the Fourier transform layers of three scales are 256 points, 512 points, and 1024 points respectively. Based on Fourier transform layers of three scales, STFT magnitude spectra of the speech sample and the target speech sample in the Fourier transform layer of each scale are calculated, and then for the STFT magnitude spectra of the Fourier transform layer of each scale, power compression processing (for example, 0.3 power compression processing) is performed through a corresponding power compression processing layer to obtain a compressed amplitude spectrum at each scale. Then, for each scale, the compressed amplitude difference between the compressed amplitude spectrum of the speech sample and the compressed amplitude spectrum of the target speech sample is determined. Finally, summing and averaging processing is performed on the compressed amplitude differences at the three scales, and the obtained result is used as the content difference between the content of the target speech sample and the content of the speech sample.

In application of the above-mentioned embodiment, the calculation of the content difference between the speech before the noise reduction processing and the speech after the noise reduction processing is added, so that the loss of speech information before and after the noise reduction processing can be reduced, the training effect of the speech noise reduction model can be improved, and the noise reduction effect of the trained speech noise reduction model is better.

Step 104: Update a model parameter of the speech noise reduction model based on the pronunciation prediction result and the content difference, to obtain a trained speech noise reduction model.

Herein, after the server predicts, based on the pronunciation difference processing layer, the pronunciation prediction result corresponding to the speech sample, and determines the content difference between the content of the speech sample and the content of the target speech sample based on the content difference processing layer, the server updates the model parameter of the speech noise reduction model based on the pronunciation prediction result and the content difference, so as to obtain the trained speech noise reduction model.

In some embodiments, the pronunciation difference processing layer includes: a pronunciation score loss processing layer. The server can update the model parameter of the speech noise reduction model based on the pronunciation prediction result and the content difference in the following manner: determining, through the pronunciation scoring loss processing layer, a difference between the pronunciation prediction result and a sample label corresponding to the speech sample, and determining a value of a scoring loss function based on the difference; and updating the model parameter of the speech noise reduction model based on the content difference and the value of the scoring loss function.

Herein, the pronunciation difference processing layer also includes a pronunciation scoring loss processing layer. The pronunciation scoring loss processing layer is configured to determine the value of the scoring loss function based on a difference between the pronunciation prediction result and the sample label corresponding to the speech sample. The sample label is a real pronunciation score corresponding to the speech sample. In practical application, the value of the pronunciation loss function can be calculated by the following formula:

$$Lp(x, \hat{x}) = \left(\frac{1}{T}\sum_{t=1}^{T}|x_t - \hat{x}_t|^p\right)^{\frac{1}{p}};$$

where $Lp(x,\hat{x})$ is a value of a pronunciation loss function, $p>=1$, $x_t$ is a real pronunciation score, and $\hat{x}_t$ is the pronunciation prediction result output by the pronunciation difference processing layer.

After the value of the scoring loss function is determined, the model parameter of the speech noise reduction model is updated based on the value of the scoring loss function and the content difference.

Figure 11:
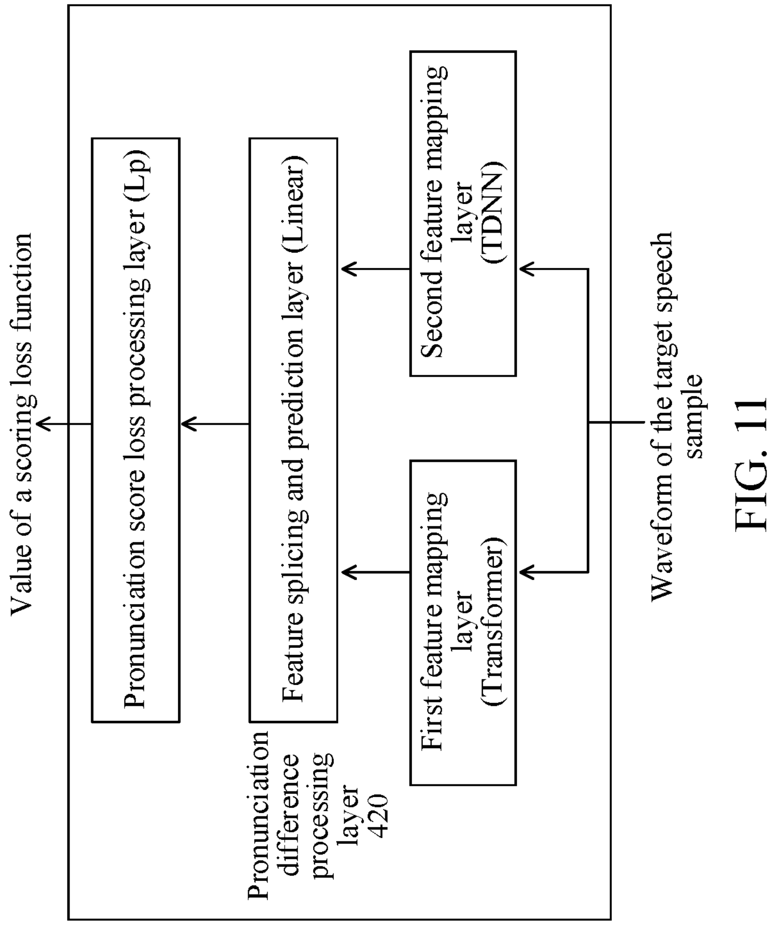
FIG. 11 is a schematic structural diagram of a pronunciation difference processing layer according to an embodiment of this application.

As an example, referring to FIG. 11, FIG. 11 is a schematic structural diagram of a pronunciation difference processing layer according to an embodiment of this application. Herein, the pronunciation difference processing layer 420 includes a first feature mapping layer (constructed through a TDNN network), a second feature mapping layer (constructed through a transformer network), a feature splicing and prediction layer (that is, a linear fusion layer Linear), and a pronunciation scoring loss processing layer, and the pronunciation scoring loss processing layer includes a pronunciation similarity scoring loss Lp. A number of layers of the TDNN network is greater than 3, a number of hidden layer nodes is greater than 128, and the Sigmoid function is used as an output activation function. A number of encoding layers of the transformer network is greater than 6, a number of decoding layers is greater than 4, a number of attention heads is greater than 4, and a number of hidden nodes is greater than 128. The pronunciation similarity score loss Lp is calculated using the following formula:

$$Lp(x, \hat{x}) = \left(\frac{1}{T}\sum_{t=1}^{T}|x_t - \hat{x}_t|^p\right)^{\frac{1}{p}};$$

where $p>=1$, $x_t$ is a real pronunciation score, and $\hat{x}_t$ is a pronunciation score predicted by a pronunciation error prediction network (that is, the pronunciation prediction result).

In some embodiments, the server can update the model parameter of the speech noise reduction model based on the content difference and the value of the scoring loss function in the following manner: obtaining a first weight value corresponding to the content difference and a second weight value corresponding to the value of the scoring loss function; performing weighting processing on the content difference and the value of the scoring loss function based on the first weight value and the second weight value, to obtain the value of the loss function of the speech noise reduction model; and updating the model parameter of the speech noise reduction model based on the value of the loss function.

Herein, the first weight value corresponding to the content difference and the second weight value corresponding to the value of the scoring loss function may be preset. In this case, when updating the model parameter of the speech noise reduction model based on the content difference and the value of the scoring loss function, the server first obtains the first weight value corresponding to the content difference and the second weight value corresponding to the value of the scoring loss function. Then, the server determines the value of the loss function of the speech noise reduction model according to the first weight value and the second weight value based on the content difference and the value of the scoring loss function. The server may perform weighting processing on the content difference and the value of the scoring loss function based on the first weight value and the second weight value, and uses an obtained result as the value of the loss function of the speech noise reduction model. Finally, the server updates the model parameter of the speech noise reduction model based on the value of the loss function of the speech noise reduction model.

In some embodiments, the server can update the model parameter of the speech noise reduction model based on the value of the loss function in the following manner: when the value of the loss function exceeds a loss threshold, determining an error signal of the speech noise reduction model based on the loss function; and backpropagating the error signal in the speech noise reduction model, and updating a model parameter of each layer in the speech noise reduction model during the propagation.

Herein, when updating the model parameter of the speech noise reduction model based on the value of the loss function of the speech noise reduction model, the server determines whether the value of the loss function exceeds a loss threshold. When the value of the loss function exceeds the loss threshold, the server determines the error signal of the speech noise reduction model based on the loss function, and backpropagates the error signal in the speech noise reduction model, so that during error information backpropagation, the server updates a model parameter of each layer in the speech noise reduction model until the loss function converges. A model parameter of the speech noise reduction model obtained during convergence is used as the model parameter of the trained speech noise reduction model.

In application of the embodiments of this application, the pronunciation difference processing layer and the content difference processing layer are added in the speech noise reduction model, after the noise processing layer of the speech noise reduction model performs noise reduction processing on the speech sample, the pronunciation difference processing layer predicts the target speech sample obtained by the noise reduction processing, to obtain the pronunciation prediction result for indicating the pronunciation similarity between the target speech sample and the reference pronunciation corresponding to the speech sample, and the content difference processing layer determines the content difference between the content of the target speech sample and the content of the speech sample, so that the model parameter of the speech noise reduction model is updated based on the pronunciation prediction result and the content difference, to obtain the trained speech noise reduction model. In this way, the speech noise reduction model is obtained through training based on the pronunciation similarity between the speech before the noise reduction processing and the speech after the noise reduction processing, and the content difference between the speech before the noise reduction processing and the speech after the noise reduction processing. This reduces the impact of the loss of speech information before and after the noise reduction processing on model training, and improves the training effect of the speech noise reduction model. When the speech noise reduction model performs speech noise reduction processing, the loss of speech information before and after the noise reduction processing can be reduced, and the precision of the speech noise reduction processing and the speech noise reduction effect can be improved.

Based on the above description of the speech noise reduction model training method provided in the embodiments of this application, the speech scoring method provided by the embodiments of this application is described below. The speech scoring method is applied to the speech noise reduction model, and the speech noise reduction model is obtained through training based on the above speech noise reduction model training method.

Figure 12:
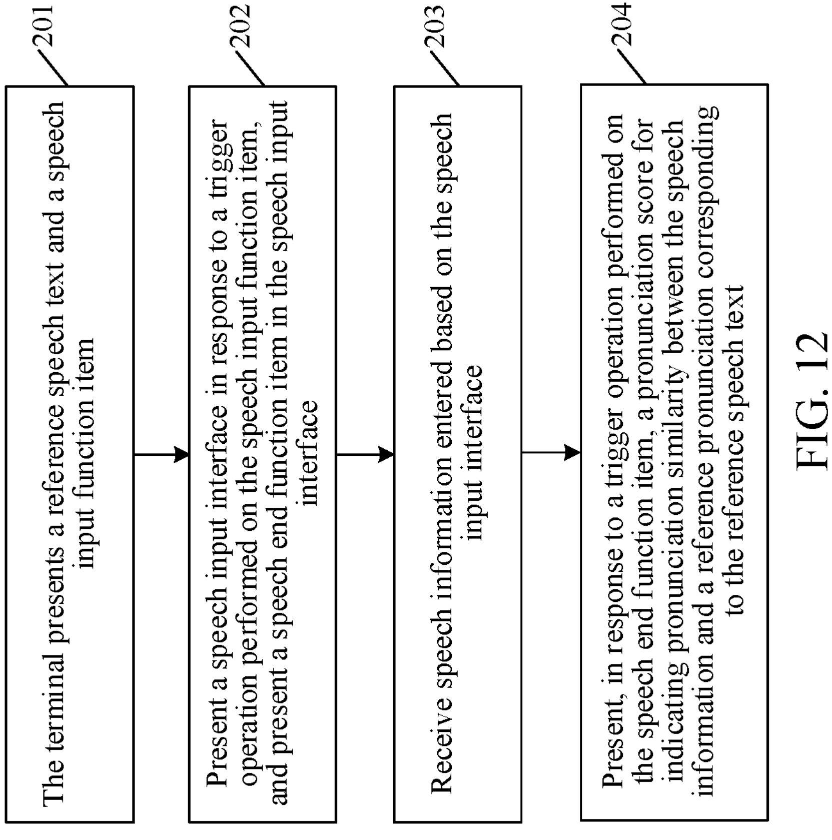
FIG. 12 is a schematic flowchart of a speech scoring method according to an embodiment of this application.

In some embodiments, the speech scoring method provided by the embodiments of this application can be implemented separately by the server or the terminal, or jointly implemented by the server and the terminal. The following uses the implementation of the terminal as an example to illustrate the speech scoring method provided by the embodiments of this application. Referring to FIG. 12, FIG. 12 is a schematic flowchart of a speech scoring method according to an embodiment of this application. The speech scoring method provided by the embodiments of this application includes:

Step 201: The terminal presents a reference speech text and a speech input function item.

Herein, the terminal is provided with a client for speech scoring. The reference speech text and the speech input function item are presented by running the client.

Step 202: Present a speech input interface in response to a trigger operation performed on the speech input function item, and present a speech end function item in the speech input interface.

When a trigger operation performed on the speech input function item is received, a speech input interface is presented in response to the trigger operation, and at the same time, the speech end function item is presented in the speech input interface. In this case, the user may input corresponding speech information according to the reference speech text based on the speech input interface.

Step 203: Receive speech information entered based on the speech input interface.

Step 204: Present, in response to a trigger operation performed on the speech end function item, a pronunciation score for indicating pronunciation similarity between the speech information and a reference pronunciation corresponding to the reference speech text.

The terminal receives speech information entered based on the speech input interface. When a trigger operation performed on the speech end function item is received, the terminal presents, in response to the trigger operation, a pronunciation score for indicating pronunciation similarity between the speech information and a reference pronunciation corresponding to the reference speech text; In practical application, the pronunciation score can be identified in various manners such as numbers and graphics.

The pronunciation score is obtained based on prediction of a pronunciation score of target speech information, and the target speech information is obtained by performing noise reduction processing on the speech information based on the speech noise reduction model. The speech noise reduction model is obtained through training based on the above speech noise reduction model training method.

Figure 13:
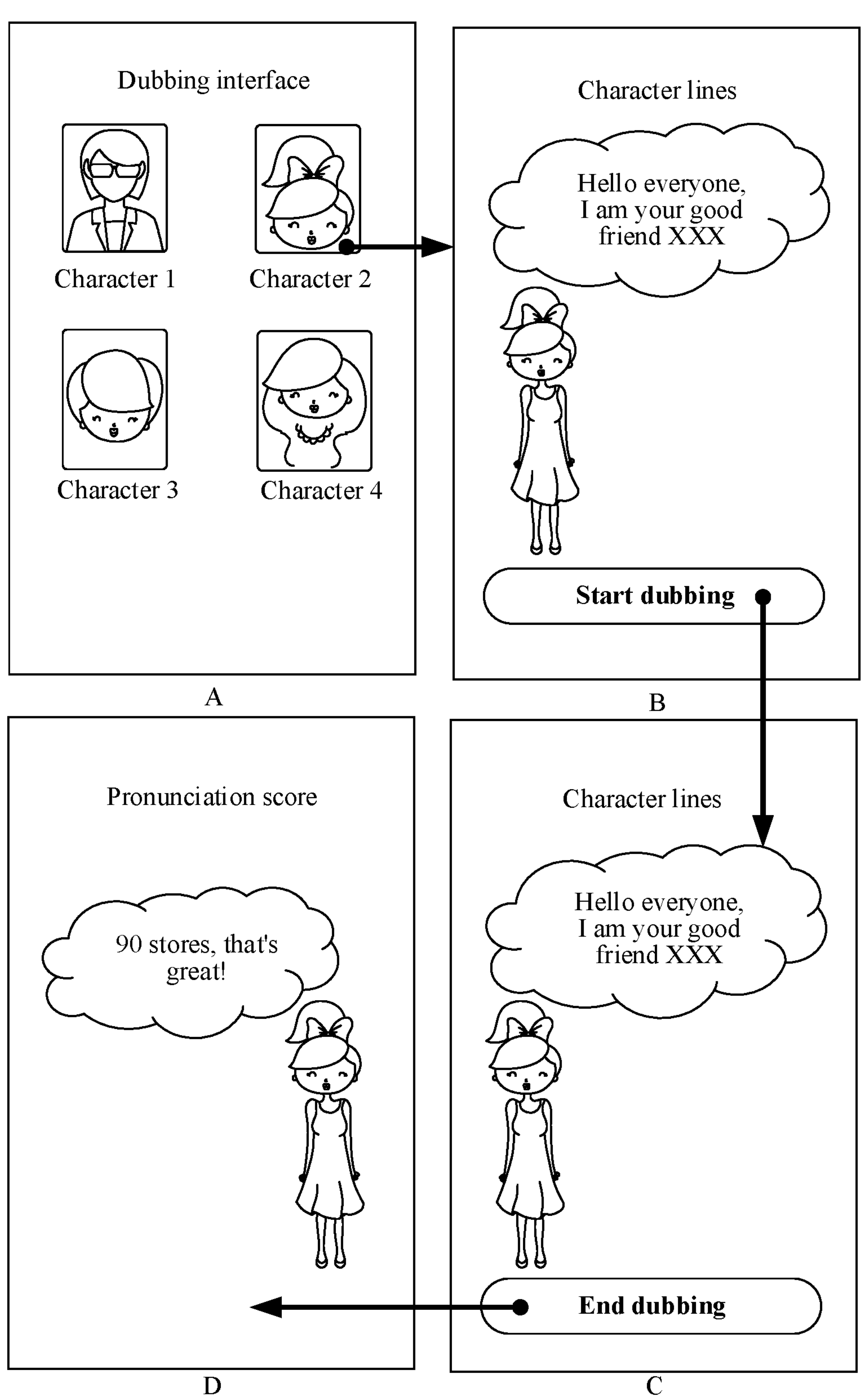
FIG. 13 is a schematic diagram of presenting a speech scoring procedure according to an embodiment of this application.

As an example, referring to FIG. 13, FIG. 13 is a schematic diagram of presenting a speech scoring procedure according to an embodiment of this application. Herein, for example, the speech scoring method provided in the embodiments of this application is applied to character dubbing. A terminal displays multiple selectable dubbing characters in a dubbing interface, including "character 1, character 2, character 3, and character 4", and a corresponding dubbing entry that can be represented by a character image, as shown in FIG. A in FIG. 13. When a trigger operation performed on the dubbing entry corresponding to "character 2" is received, a reference speech text "Hello everyone, I am your good friend XXX" (that is, character lines) corresponding to "character 2" and a speech input function item "start dubbing" are presented, as shown in FIG. B in FIG. 13.

In response to the trigger operation performed on the speech input function item "start dubbing", a speech input interface is presented, and the speech end function item "end dubbing" is presented in the speech input interface, as shown in FIG. C in FIG. 13. When speech information entered based on the speech input interface is received, in response to the trigger operation performed on the speech end function item "end dubbing", a pronunciation score for indicating the pronunciation similarity between the received speech information and the reference pronunciation corresponding to the reference speech text "Hello everyone, I am your good friend XXX", that is, "90 scores, it's great!", as shown in FIG. D in FIG. 13.

In practical application, the speech scoring method provided in the embodiments of this application can also be applied to singing scoring scenarios. Specifically, when a user selects a desired song during singing, the terminal presents a reference speech text (that is, lyrics) corresponding to the song and a speech input function item. A speech input interface is presented in response to a trigger operation performed on the speech input function item, to collect singing speech information of the user, and a speech end function item is presented in the speech input interface. When the singing speech information entered based on the speech input interface is received, in response to the trigger operation performed on the speech end function item, a pronunciation score for indicating the pronunciation similarity between the singing speech information and the reference pronunciation corresponding to the reference speech text is presented.

In application of the embodiments of this application, the pronunciation difference processing layer and the content difference processing layer are added in the speech noise reduction model, after the noise processing layer of the speech noise reduction model performs noise reduction processing on the speech sample, the pronunciation difference processing layer predicts the target speech sample obtained by the noise reduction processing, to obtain the pronunciation prediction result for indicating the pronunciation similarity between the target speech sample and the reference pronunciation corresponding to the speech sample, and the content difference processing layer determines the content difference between the content of the target speech sample and the content of the speech sample, so that the model parameter of the speech noise reduction model is updated based on the pronunciation prediction result and the content difference, to obtain the trained speech noise reduction model. In this way, the speech noise reduction model is obtained through training based on the pronunciation similarity between the speech before the noise reduction processing and the speech after the noise reduction processing, and the content difference between the speech before the noise reduction processing and the speech after the noise reduction processing. This improves the training effect of the speech noise reduction model. When the speech noise reduction model performs speech noise reduction processing, the loss of speech information before and after the noise reduction processing can be reduced, and the precision of the speech noise reduction processing and the speech noise reduction effect can be improved, thereby further improving the prediction precision of pronunciation score prediction based on the noise reduced speech information.

An exemplary application of the embodiments of this application in an actual application scenario will be described below.

In related technologies, speech enhancement (that is, speech noise reduction) solutions are all pure acoustic prediction solutions, and the goal of prediction is usually that a waveform of an enhanced speech is most similar to a waveform of a pure speech. For computer-assisted language teaching, that the waveform of the enhanced speech is most similar to the waveform of the pure speech is not the best solution. In practical application, in learning with the goal that the waveforms are the most similar, only the degree of recovery of vowels with large amplitudes is paid attention to, and the degree of recovery of consonants with small amplitudes is ignored, which may easily cause loss of fricative sounds, loss of plosive sounds, lack of aspirated segments in aspirated sounds, and the like. Therefore, the accuracy of pronunciation score prediction is affected by speech noise reduction processing.

Based on this, an embodiment of this application provides a speech noise reduction model training method. A pronunciation error prediction network (that is, the pronunciation difference processing layer) and a speech similarity measurement network (that is, the content difference processing layer) are introduced into the speech noise reduction model, to explicitly punish pronunciation error information of the enhanced speech. Besides, a speech enhancement network that can integrate and promote spectrum harmonic information, phase information, and amplitude information is proposed. This is emphasized in detail design of the cascaded activation network CasNet, the structure of multiple harmonic enhancers H is included, and the phase estimation is performed by using the magnitude spectrum to assist the phase spectrum.

Next, an application scenario of the speech noise reduction model training method provided by the embodiments of this application will be described. Referring to FIG. 13, the method is mainly used in the character dubbing evaluation function. Herein, (1) Click on a start dubbing button to start reading the character lines. (2) Click on end dubbing to end reading character lines. 3) The screen presents, to a user, a pronunciation prediction result of a collected speech dubbed by a character. FIG. 13 shows that the pronunciation prediction result of the speech dubbed by the character is represented by scores, that is, 90 scores.

Figure 14:
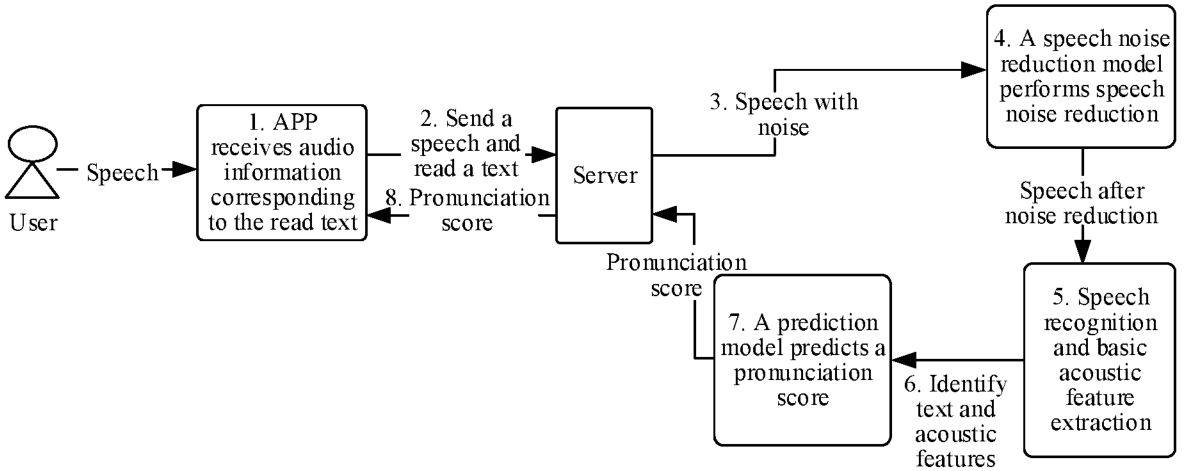
FIG. 14 is a schematic flowchart of a speech scoring method based on a speech noise reduction model according to an embodiment of this application.

Next, the speech scoring method provided by the embodiments of this application is described in detail. Referring to FIG. 14, FIG. 14 is a schematic flowchart of a speech scoring method based on a speech noise reduction model according to an embodiment of this application. The method includes: (1) A user opens a speech scoring client, the screen displays a text to be read, the user clicks on a start recording button displayed on the client, and reads sentences based on the text to be read.

(2) The client sends, to the server, audio information collected during reading and the text to be read.

(3) The server sends the audio information to the speech noise reduction model for speech noise reduction processing.

(4) After performing noise reduction processing on the audio information, the speech noise reduction model enters the audio information after noise reduction into a speech recognition model.

(5) The speech recognition model performs speech recognition and basic acoustic feature extraction on the audio information after noise reduction, and obtains the recognized text and acoustic features (for example, pronunciation accuracy, pronunciation fluency, and pronunciation rhythm).

(6) The speech recognition model enters a result of speech recognition (that is, the recognized text and acoustic features) to a prediction model.

(7) The prediction model predicts a pronunciation score based on the recognized text and acoustic features, outputs the pronunciation score, and returns the pronunciation score to the server.

(8) The server receives the pronunciation score, and returns the pronunciation score to the client, so that the user can view the final pronunciation score on the client.

Next, the speech noise reduction model provided by the embodiments of this application is described below. Referring to FIG. 4, the speech noise reduction model includes a speech enhancement network EnhanceNet (that is, the noise processing layer), a pronunciation error predictor PronNet (that is, the pronunciation difference processing layer), and a multi-scale speech similarity measurement network SimilarNet (that is, the content difference processing layer).

Specifically, a training process of the speech noise reduction model can be as follows: performing speech enhancement processing (that is, noise reduction processing) on a collected original speech through the speech enhancement network EnhanceNet, and then inputting a target speech after noise reduction into the pronunciation error prediction network PronNet and the multi-scale speech similarity measurement network SimilarNet; obtaining a pronunciation similarity score loss through the pronunciation error prediction network PronNet, and obtaining a speech similarity loss through the multi-scale speech similarity measurement network SimilarNet (that is, a loss of speech content before and after noise reduction); and determining the loss of the speech noise reduction model based on the pronunciation similarity score loss and the speech similarity loss, and then performing gradient feedback based on the loss of the speech noise reduction model, to update the model parameter of the speech noise reduction model, thereby implementing model training of the speech noise reduction model.

Referring to FIG. 5, herein, the speech enhancement network EnhanceNet includes a pre-processing network PrevNet (that is, the first feature transform layer), a post-processing network PostNet (that is, the second feature transform layer), and a cascaded activation network CasNet (that is, the filtering processing layer).

The pre-processing network PrevNet includes a Fourier transform layer and multiple convolutional layers, as shown in FIG. 6. The pre-processing network PrevNet (that is, the first feature transform layer) converts the waveform of the original speech into a 2-channel Fourier spectrum through the Fourier transform layer by performing STFT transform, and then the 2-channel Fourier spectrum is converted into a 64-channel amplitude spectrum A and a 64-channel phase spectrum P through the convolution layer.

The cascaded activation network CasNet (that is, the filtering processing layer) is formed by cascading multiple third-order activation attention modules TAB (that is, the filtering processing sub-layers), as shown in FIG. 7. Herein, the cascaded activation network CasNet performs convolution layer filtering processing on the 64-channel amplitude spectrum A and the 64-channel phase spectrum P outputted by the pre-processing network PrevNet, and outputs the 64-channel amplitude spectrum A' and the 64-channel phase spectrum P'.

As shown in FIG. A in FIG. 8, the third-order attention module TAB (that is, the filtering processing sub-layer) in the cascaded activation network CasNet includes a third-order amplitude spectrum enhancement network AmpNet and a first-order phase spectrum correction network PhaseNet. The amplitude spectrum enhancement network AmpNet (that is, the amplitude spectrum filtering network) enhances the 64-channel amplitude spectrum A output by the pre-processing network, to obtain the amplitude spectrum A', and the phase spectrum correction layer PhaseNet receives two inputs, where one input is the enhanced amplitude spectrum A' and the other input is the phase spectrum P. A relationship between the output phase spectrum P' and the two inputs is: $P''=P \circ Tanh(Conv(A'' \oplus P))$ where Conv( ) is the convolution operation; Tanh( ) is Hyperbolic tangent function operation (which converts an input value into a value between −1 and 1); $\circ$ indicates point product; and $\oplus$ indicates splicing.

Further, The amplitude spectrum enhancement network AmpNet includes three levels of harmonic enhancers H (that is, the amplitude spectrum filtering layers) (as shown in FIG. B in FIG. 8), and the composition of the harmonic enhancer H is shown in FIG. C in FIG. 8.

Referring to FIG. 9, the post-processing network PostNet (that is, the second feature transform layer) includes multiple convolutional layers, the 64-channel amplitude spectrum A' output by the cascaded activation network CasNet is converted into a 1-channel amplitude mask M, the 64-channel phase spectrum P' is converted into a 2-channel phase angle Ω, and then inverse Fourier transform is performed to convert into a waveform for output, that is, the target speech after noise reduction is obtained.

Referring to FIG. 11, the pronunciation error prediction network PronNet includes a TDNN network (that is, the second feature mapping layer), a transformer network (that is, the first feature mapping layer), a linear fusion layer Linear (that is, the feature splicing and prediction layer), and a pronunciation scoring loss processing layer. A number of layers of the TDNN network is greater than 3, a number of hidden layer nodes is greater than 128, and the Sigmoid function is used as an output activation function. A number of encoding layers of the transformer network is greater than 6, a number of decoding layers is greater than 4, a number of attention heads is greater than 4, and a number of hidden nodes is greater than 128. The pronunciation similarity scoring loss Lp of the pronunciation scoring loss processing layer is calculated using the following formula:

$$Lp(x, \hat{x}) = \left(\frac{1}{T}\sum_{t=1}^{T}|x_t - \hat{x}_t|^p\right)^{\frac{1}{p}};$$

where p>=1, $x_t$ t is a real pronunciation score, and $\hat{x}_t$ is a pronunciation score predicted by a pronunciation error prediction network (that is, the pronunciation prediction result).

Referring to FIG. 10, the multi-scale speech similarity measurement network SimilarNet includes a Fourier transform layer including three different Fourier transform scales, and analysis window sizes of the three scales are 256 points, 512 points, and 1024 points respectively. Under the three window length conditions, STFT spectra of the original speech sample and the target speech sample are calculated respectively, and then 0.3 power compression is performed on the calculated STFT spectra through the power compression processing layer, to obtain CompressSTFT spectra. The CompressSTFT spectra of the original speech sample and the target speech sample are used to calculate a compressed amplitude difference at each scale, and the calculated compressed amplitude difference is used as a speech similarity loss at the corresponding scale. Finally, summing and averaging processing is performed on the compressed amplitude differences at the three scales, and the obtained result is used as the final speech similarity loss (that is, the content difference).

In some other embodiments, the PrevNet and PostNet proposed in this application may adopt multiple different implementation solutions. PrevNet only needs to transform the waveform signal into a 2-channel time-frequency feature, and then transform the 2-channel time-frequency feature into a high-channel time-frequency feature. During the implementation of this application, it is found that the higher number of channels indicates the better performance. The design of PostNet is also similar, and BLSTM, GRU, or the transformer structure can also be used to perform conversion from a high-channel feature to a 2-channel time-frequency domain, and then the time-frequency domain is converted into a waveform signal.

In application of the embodiments of this application, in a pronunciation prediction scenario, the pronunciation error network and the multi-scale speech similarity measurement network are introduced into the speech noise reduction network. while speech noise reduction is performed, the impact of noise reduction processing on the pronunciation prediction is reduced. This greatly reduces the pronunciation prediction errors caused by noise reduction. Especially for features of consonants such as fricatives, plosives, and aspirated sounds, after the pronunciation error network is introduced, error prediction rates of these three sounds are relatively reduced by 23.5%.

It can be understood that, in the embodiments of this application, related data such as user information is involved, when the embodiments of this application is applied to a specific product or technology, it is necessary to obtain the user's permission or consent, and the collection, usage, and processing of related data need to comply with relevant laws, regulations and standards of relevant countries and regions.

An exemplary structure of the speech noise reduction model training module 555 implemented as software modules in the embodiments of this application is described below. In some embodiments, as shown in FIG. 2, software modules of the speech noise reduction model training module 555 stored in the memory 550 may include: a noise reduction sub-module 5551, configured to perform noise reduction processing on a speech sample through the noise processing layer, to obtain a target speech sample; a prediction module sub-5552, configured to predict the target speech sample through the pronunciation difference processing layer, to obtain a pronunciation prediction result, where the pronunciation prediction result indicates a pronunciation similarity between the target speech sample and a reference pronunciation corresponding to the speech sample; a determination sub-module 5553, configured to determine a content difference between content of the target speech sample and content of the speech sample through the content difference processing layer; and an updating sub-module 5554, configured to update a model parameter of the speech noise reduction model based on the pronunciation prediction result and the content difference, to obtain a trained speech noise reduction model.

In some embodiments, the noise processing layer includes: a first feature transform layer, a filtering processing layer, and a second feature transform layer. The noise reduction sub-module 5551 is further configured to perform Fourier transform on the speech sample through the first feature transform layer, to obtain an amplitude spectrum and a phase spectrum of the speech sample; filter the magnitude spectrum through the filtering processing layer to obtain a target magnitude spectrum, and perform phase correction on the phase spectrum to obtain a target phase spectrum; and multiply the target magnitude spectrum and the target phase spectrum through the second feature transform layer, and perform inverse Fourier transform on a multiplication result, to obtain the target speech sample.

In some embodiments, the filter processing layer includes at least two cascaded filtering processing sub-layers. The noise reduction sub-module 5551 is further configured to filter the magnitude spectrum through a first-level filtering processing sub-layer to obtain an intermediate magnitude spectrum, and perform phase correction on the phase spectrum to obtain an intermediate phase spectrum; and filter the intermediate magnitude spectrum through the non-first-level filtering processing sub-layer to obtain a target magnitude spectrum, and perform phase correction on the intermediate phase spectrum to obtain a target phase spectrum.

In some embodiments, each of the filtering processing sub-layers includes a phase spectrum correction layer and at least two cascaded amplitude spectrum filtering layers. The noise reduction sub-module 5551 is further configured to perform filtering processing on the amplitude spectrum through the at least two cascaded amplitude spectrum filtering layers, to obtain the intermediate amplitude spectrum; and perform phase correction on the phase spectrum through the phase spectrum correction layer based on the intermediate amplitude spectrum, to obtain the intermediate phase spectrum.

In some embodiments, the second feature transform layer includes a feature conversion layer and a feature inverse transform layer. The noise reduction sub-module 5551 is further configured to convert the target magnitude spectrum into a magnitude spectrum mask through the feature conversion layer, and determine a phase angle corresponding to the target phase spectrum; and multiply, through the feature inverse transform layer, the target magnitude spectrum, the magnitude spectrum mask, and the phase angle corresponding to the target phase spectrum, and perform inverse Fourier transform on a multiplication result, to obtain the target speech sample.

In some embodiments, the content difference processing layer includes: a Fourier transform layer; and the determining sub-module 5553 is further configured to perform Fourier transform on the target speech sample through the Fourier transform layer, to obtain a first magnitude spectrum, and perform Fourier transform on the speech sample, to obtain a second magnitude spectrum; and determine a magnitude difference between the first magnitude spectrum and the second magnitude spectrum, and determine the magnitude difference as the content difference between the content of the target speech sample and the content of the speech sample.

In some embodiments, the Fourier transform layer includes at least two Fourier transform sub-layers, and different Fourier transform sub-layers correspond to different transform scales. The determining sub-module 5553 is further configured to perform Fourier transform of a corresponding transform scale on the target speech sample through each of the Fourier transform sub-layers, to obtain the first amplitude spectrum corresponding to each of the Fourier transform sub-layers; and perform Fourier transform of a corresponding transform scale on the speech sample through each of the Fourier transform sub-layers, to obtain the second amplitude spectrum corresponding to each of the Fourier transform sub-layers. The determination sub-module 5553 is further configured to determine an intermediate amplitude difference between the first amplitude spectrum and the second amplitude spectrum corresponding to each of the Fourier transform sub-layers; and perform summing and averaging processing on intermediate amplitude differences corresponding to the at least two Fourier transform sub-layers, to obtain an average amplitude difference, and using the average amplitude difference as the amplitude difference.

In some embodiments, the content difference processing layer further includes: a power compression processing layer; and the determination sub-module 5553 is further configured to perform compression processing on the first amplitude spectrum through the power compression processing layer, to obtain a first compressed amplitude spectrum, and perform compression processing on the second amplitude spectrum, to obtain a second compressed amplitude spectrum; and determine a compressed magnitude difference between the first compressed magnitude spectrum and the second compressed magnitude spectrum, and use the compressed magnitude difference as the magnitude difference.

In some embodiments, the pronunciation difference processing layer includes: a pronunciation score loss processing layer; and the updating sub-module 5554 is further configured to determine, through the pronunciation scoring loss processing layer, a difference between the pronunciation prediction result and a sample label corresponding to the speech sample, and determine a value of a scoring loss function based on the difference; and update the model parameter of the speech noise reduction model based on the content difference and the value of the scoring loss function.

In some embodiments, the updating sub-module 5554 is further configured to obtain a first weight value corresponding to the content difference and a second weight value corresponding to the value of the scoring loss function; perform weighting processing on the content difference and the value of the scoring loss function based on the first weight value and the second weight value, to obtain the value of the loss function of the speech noise reduction model; and update the model parameter of the speech noise reduction model based on the value of the loss function.

In some embodiments, the updating sub-module 5554 is further configured to: when the value of the loss function exceeds a loss threshold, determine an error signal of the speech noise reduction model based on the loss function; and backpropagate the error signal in the speech noise reduction model, and update a model parameter of each layer in the speech noise reduction model during the propagation.

In some embodiments, the pronunciation difference processing layer further includes: a first feature mapping layer, a second feature mapping layer, and a feature splicing and prediction layer, where a network structure of the first feature mapping layer is different from a network structure of the second feature mapping layer. The prediction sub-module 5552 is further configured to perform mapping processing on the target speech sample through the first feature mapping layer, to obtain a first mapping feature; perform mapping processing on the target speech sample through the second feature mapping layer, to obtain a second mapping feature; and perform splicing processing on the first mapping feature and the second mapping feature through the feature splicing and prediction layer, to obtain a spliced feature; and predicting the spliced feature to obtain the pronunciation prediction result.

In application of the embodiments of this application, the pronunciation difference processing layer and the content difference processing layer are added in the speech noise reduction model, after the noise processing layer of the speech noise reduction model performs noise reduction processing on the speech sample, the pronunciation difference processing layer predicts the target speech sample obtained by the noise reduction processing, to obtain the pronunciation prediction result for indicating the pronunciation similarity between the target speech sample and the reference pronunciation corresponding to the speech sample, and the content difference processing layer determines the content difference between the content of the target speech sample and the content of the speech sample, so that the model parameter of the speech noise reduction model is updated based on the pronunciation prediction result and the content difference, to obtain the trained speech noise reduction model. In this way, the speech noise reduction model is obtained through training based on the pronunciation similarity between the speech before the noise reduction processing and the speech after the noise reduction processing, and the content difference between the speech before the noise reduction processing and the speech after the noise reduction processing. This reduces the impact of the loss of speech information before and after the noise reduction processing on model training, and improves the training effect of the speech noise reduction model. When the speech noise reduction model performs speech noise reduction processing, the loss of speech information before and after the noise reduction processing can be reduced, and the precision of the speech noise reduction processing and the speech noise reduction effect can be improved.

The speech scoring apparatus provided in the embodiments of this application is described below, and is applied to a speech noise reduction model. The speech scoring apparatus provided in the embodiments of this application includes: a first presentation module, configured to present a reference speech text and a speech input function item; a second presentation module, configured to present a speech input interface in response to a trigger operation performed on the speech input function item, and present a speech end function item in the speech input interface; a receiving module, configured to receive speech information entered based on the speech input interface; and a third presentation module, configured to present, in response to a trigger operation performed on the speech end function item, a pronunciation score for indicating pronunciation similarity between the speech information and a reference pronunciation corresponding to the reference speech text; the pronunciation score being obtained based on prediction of a pronunciation score of target speech information, and the target speech information being obtained by performing noise reduction processing on the speech information based on the speech noise reduction model; and the speech noise reduction model being obtained through training based on the above speech noise reduction model training method.

In application of the embodiments of this application, the pronunciation difference processing layer and the content difference processing layer are added in the speech noise reduction model, after the noise processing layer of the speech noise reduction model performs noise reduction processing on the speech sample, the pronunciation difference processing layer predicts the target speech sample obtained by the noise reduction processing, to obtain the pronunciation prediction result for indicating the pronunciation similarity between the target speech sample and the reference pronunciation corresponding to the speech sample, and the content difference processing layer determines the content difference between the content of the target speech sample and the content of the speech sample, so that the model parameter of the speech noise reduction model is updated based on the pronunciation prediction result and the content difference, to obtain the trained speech noise reduction model. In this way, the speech noise reduction model is obtained through training based on the pronunciation similarity between the speech before the noise reduction processing and the speech after the noise reduction processing, and the content difference between the speech before the noise reduction processing and the speech after the noise reduction processing. This reduces the impact of the loss of speech information before and after the noise reduction processing on model training, and improves the training effect of the speech noise reduction model. When the speech noise reduction model performs speech noise reduction processing, the loss of speech information before and after the noise reduction processing can be reduced, and the precision of the speech noise reduction processing and the speech noise reduction effect can be improved, thereby further improving the prediction precision of pronunciation score prediction based on the noise reduced speech information.

An embodiment of this application also provides an electronic device, and the electronic device includes:

a memory, configured to store a computer executable instruction; and a processor, configured to execute the computer executable instruction stored in the memory, to perform the method according to the embodiments of this application.

An embodiment of this application further provides a computer program product or a computer program, including a computer executable instruction stored in a non-transitory computer-readable storage medium. A processor of a computer device reads the computer executable instruction from the computer-readable storage medium, and the processor executes the computer executable instruction, so that the computer device performs the method provided in the embodiments of this application.

An embodiment of this application further provides a non-transitory computer-readable storage medium, storing a computer executable instruction, and the computer executable instruction is executed by the processor to implement the speech noise reduction model training method provided in the embodiments of this application.

In some embodiments, the computer-readable storage medium may be a memory such as an FRAM, a ROM, a PROM, an EPROM, an EEPROM, a flash memory, a magnetic surface memory, an optical disc, or a CD-ROM; or may be various devices including one of or any combination of the foregoing memories.

In some embodiments, the computer executable instruction may be in the form of programs, software, software modules, scripts, or code written in any form of programming language (including compiled or interpreted languages, or declarative or procedural languages), and can be deployed in any form, for example, deployed as a standalone program or as a module, component, subroutine, or other units suitable for usage in a computing environment.

As an example, the computer executable instruction can, but may not necessarily correspond to files in a file system, can be stored as a part of a file that holds other programs or data, for example, stored in one or more scripts stored in a hypertext markup language (HTML) document, stored in a single file dedicated to the program in question, or stored in multiple collaborative files (for example, files that store one or more modules, sub-programs, or code portions).

As an example, the computer executable instruction can be deployed to be executed on one computing device, or on multiple computing devices located at one site, or on multiple computing devices distributed across multiple sites and interconnected by a communication network.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The foregoing descriptions are merely preferred embodiments of this application and are not intended to limit the protection scope of this application. Any modification, equivalent replacement, or improvement made without departing from the spirit and scope of this application shall fall within the protection scope of this application.

What is claimed is:

1. A speech scoring method performed by an electronic device, comprising:

receiving speech information and associated reference speech text via a speech input interface, wherein the reference speech text has a corresponding reference pronunciation and the speech information represents an audio signal of a person reading the associated reference speech text to the speech input interface;

performing noise reduction processing on the speech information based on a speech noise reduction model to obtain noise-reduced speech information;

performing speech recognition on the noise-reduced speech information to recognize text in the noise-reduced speech information and acoustic features associated with the speech information;

predicting a pronunciation score for indicating pronunciation similarity between the speech information and the reference pronunciation corresponding to the reference speech text based on (i) content differences between the recognized text and the associated reference speech text and (ii) pronunciation differences between the acoustic features of the audio signal and the reference pronunciation; and presenting the pronunciation score on the speech input interface in response to a trigger operation on a speech end function item in the speech input interface by the person.

2. The method according to claim 1, wherein the speech noise reduction model comprises: a noise processing layer, a pronunciation difference processing layer, and a content difference processing layer, and the speech noise reduction model is trained by:

performing noise reduction processing on a speech sample through the noise processing layer, to obtain a target speech sample;

predicting the target speech sample through the pronunciation difference processing layer, to obtain a pronunciation prediction result, wherein the pronunciation prediction result indicates a pronunciation similarity between the target speech sample and a reference pronunciation corresponding to the speech sample;

determining a content difference between content of the target speech sample and content of the speech sample through the content difference processing layer; and updating the speech noise reduction model based on the pronunciation prediction result and the content difference, to obtain a trained speech noise reduction model.

3. The method according to claim 2, wherein the noise processing layer comprises: a first feature transform layer, a filtering processing layer, and a second feature transform layer;

the performing noise reduction processing on a speech sample through the noise processing layer, to obtain a target speech sample comprises:

performing Fourier transform on the speech sample through the first feature transform layer, to obtain an amplitude spectrum and a phase spectrum of the speech sample;

filtering the magnitude spectrum through the filtering processing layer to obtain a target magnitude spectrum, and perform phase correction on the phase spectrum to obtain a target phase spectrum; and multiplying the target magnitude spectrum and the target phase spectrum through the second feature transform layer, and performing inverse Fourier transform on a multiplication result, to obtain the target speech sample.

4. The method according to claim 2, wherein the content difference processing layer comprises: a Fourier transform layer; and the determining a content difference between content of the target speech sample and content of the speech sample through the content difference processing layer comprises:

performing Fourier transform on the target speech sample through the Fourier transform layer, to obtain a first magnitude spectrum, and performing Fourier transform on the speech sample, to obtain a second magnitude spectrum; and determining a magnitude difference between the first magnitude spectrum and the second magnitude spectrum, and determining the magnitude difference as the content difference between the content of the target speech sample and the content of the speech sample.

5. The method according to claim 2, wherein the pronunciation difference processing layer comprises: a pronunciation score loss processing layer; and the updating the speech noise reduction model based on the pronunciation prediction result and the content difference comprises:

determining, through the pronunciation scoring loss processing layer, a difference between the pronunciation prediction result and a sample label corresponding to the speech sample, and determining a value of a scoring loss function based on the difference; and updating the model parameter of the speech noise reduction model based on the content difference and the value of the scoring loss function.

6. The method according to claim 5, wherein the updating the model parameter of the speech noise reduction model based on the content difference and the value of the scoring loss function comprises:

obtaining a first weight value corresponding to the content difference and a second weight value corresponding to the value of the scoring loss function;

performing weighting processing on the content difference and the value of the scoring loss function based on the first weight value and the second weight value, to obtain the value of the loss function of the speech noise reduction model; and updating the model parameter of the speech noise reduction model based on the value of the loss function.

7. The method according to claim 5, wherein the pronunciation difference processing layer further comprises: a first feature mapping layer, a second feature mapping layer, and a feature splicing and prediction layer, wherein a network structure of the first feature mapping layer is different from a network structure of the second feature mapping layer; and the predicting the target speech sample through the pronunciation difference processing layer, to obtain a pronunciation prediction result comprises:

performing mapping processing on the target speech sample through the first feature mapping layer, to obtain a first mapping feature;

performing mapping processing on the target speech sample through the second feature mapping layer, to obtain a second mapping feature;

performing splicing processing on the first mapping feature and the second mapping feature through the feature splicing and prediction layer, to obtain a spliced feature; and predicting the spliced feature to obtain the pronunciation prediction result.

8. An electronic device, comprising:

a memory, configured to store a computer executable instruction; and a processor, configured to execute the computer executable instruction stored in the memory and cause the electronic device to perform a speech scoring method including:

receiving speech information and associated reference speech text via a speech input interface, wherein the reference speech text has a corresponding reference pronunciation and the speech information represents an audio signal of a person reading the associated reference speech text to the speech input interface;

performing noise reduction processing on the speech information based on a speech noise reduction model to obtain noise-reduced speech information;

performing speech recognition on the noise-reduced speech information to recognize text in the noise-reduced speech information and acoustic features associated with the speech information;

predicting a pronunciation score for indicating pronunciation similarity between the speech information and the reference pronunciation corresponding to the reference speech text based on (i) content differences between the recognized text and the associated reference speech text and (ii) pronunciation differences between the acoustic features of the audio signal and the reference pronunciation; and presenting the pronunciation score on the speech input interface in response to a trigger operation on a speech end function item in the speech input interface by the person.

9. The electronic device according to claim 8, wherein the speech noise reduction model comprises: a noise processing layer, a pronunciation difference processing layer, and a content difference processing layer, and the speech noise reduction model is trained by:

performing noise reduction processing on a speech sample through the noise processing layer, to obtain a target speech sample;

predicting the target speech sample through the pronunciation difference processing layer, to obtain a pronunciation prediction result, wherein the pronunciation prediction result indicates a pronunciation similarity between the target speech sample and a reference pronunciation corresponding to the speech sample;

determining a content difference between content of the target speech sample and content of the speech sample through the content difference processing layer; and updating the speech noise reduction model based on the pronunciation prediction result and the content difference, to obtain a trained speech noise reduction model.

10. The electronic device according to claim 9, wherein the noise processing layer comprises: a first feature transform layer, a filtering processing layer, and a second feature transform layer;

the performing noise reduction processing on a speech sample through the noise processing layer, to obtain a target speech sample comprises:

performing Fourier transform on the speech sample through the first feature transform layer, to obtain an amplitude spectrum and a phase spectrum of the speech sample;

filtering the magnitude spectrum through the filtering processing layer to obtain a target magnitude spectrum, and perform phase correction on the phase spectrum to obtain a target phase spectrum; and multiplying the target magnitude spectrum and the target phase spectrum through the second feature transform layer, and performing inverse Fourier transform on a multiplication result, to obtain the target speech sample.

11. The electronic device according to claim 9, wherein the content difference processing layer comprises: a Fourier transform layer; and the determining a content difference between content of the target speech sample and content of the speech sample through the content difference processing layer comprises:

performing Fourier transform on the target speech sample through the Fourier transform layer, to obtain a first magnitude spectrum, and performing Fourier transform on the speech sample, to obtain a second magnitude spectrum; and determining a magnitude difference between the first magnitude spectrum and the second magnitude spectrum, and determining the magnitude difference as the content difference between the content of the target speech sample and the content of the speech sample.

12. The electronic device according to claim 9, wherein the pronunciation difference processing layer comprises: a pronunciation score loss processing layer; and the updating the speech noise reduction model based on the pronunciation prediction result and the content difference comprises:

determining, through the pronunciation scoring loss processing layer, a difference between the pronunciation prediction result and a sample label corresponding to the speech sample, and determining a value of a scoring loss function based on the difference; and updating the model parameter of the speech noise reduction model based on the content difference and the value of the scoring loss function.

13. The electronic device according to claim 12, wherein the updating the model parameter of the speech noise reduction model based on the content difference and the value of the scoring loss function comprises:

obtaining a first weight value corresponding to the content difference and a second weight value corresponding to the value of the scoring loss function;

performing weighting processing on the content difference and the value of the scoring loss function based on the first weight value and the second weight value, to obtain the value of the loss function of the speech noise reduction model; and updating the model parameter of the speech noise reduction model based on the value of the loss function.

14. The electronic device according to claim 12, wherein the pronunciation difference processing layer further comprises: a first feature mapping layer, a second feature mapping layer, and a feature splicing and prediction layer, wherein a network structure of the first feature mapping layer is different from a network structure of the second feature mapping layer; and the predicting the target speech sample through the pronunciation difference processing layer, to obtain a pronunciation prediction result comprises:

performing mapping processing on the target speech sample through the first feature mapping layer, to obtain a first mapping feature;

performing mapping processing on the target speech sample through the second feature mapping layer, to obtain a second mapping feature;

performing splicing processing on the first mapping feature and the second mapping feature through the feature splicing and prediction layer, to obtain a spliced feature; and predicting the spliced feature to obtain the pronunciation prediction result.

15. A non-transitory computer-readable storage medium, storing a computer executable instruction that, when executed by a processor of an electronic device, causes the electronic device to perform a speech scoring method including:

receiving speech information and associated reference speech text via a speech input interface, wherein the reference speech text has a corresponding reference pronunciation and the speech information represents an audio signal of a person reading the associated reference speech text to the speech input interface;

performing noise reduction processing on the speech information based on a speech noise reduction model to obtain noise-reduced speech information;

performing speech recognition on the noise-reduced speech information to recognize text in the noise-reduced speech information and acoustic features associated with the speech information;

predicting a pronunciation score for indicating pronunciation similarity between the speech information and the reference pronunciation corresponding to the reference speech text based on (i) content differences between the recognized text and the associated reference speech text and (ii) pronunciation differences between the acoustic features of the audio signal and the reference pronunciation; and presenting the pronunciation score on the speech input interface in response to a trigger operation on a speech end function item in the speech input interface by the person.

16. The non-transitory computer-readable storage medium according to claim 15, wherein the speech noise reduction model comprises: a noise processing layer, a pronunciation difference processing layer, and a content difference processing layer, and the speech noise reduction model is trained by:

performing noise reduction processing on a speech sample through the noise processing layer, to obtain a target speech sample;

predicting the target speech sample through the pronunciation difference processing layer, to obtain a pronunciation prediction result, wherein the pronunciation prediction result indicates a pronunciation similarity between the target speech sample and a reference pronunciation corresponding to the speech sample;

determining a content difference between content of the target speech sample and content of the speech sample through the content difference processing layer; and updating the speech noise reduction model based on the pronunciation prediction result and the content difference, to obtain a trained speech noise reduction model.

17. The non-transitory computer-readable storage medium according to claim 16, wherein the noise processing layer comprises: a first feature transform layer, a filtering processing layer, and a second feature transform layer;

the performing noise reduction processing on a speech sample through the noise processing layer, to obtain a target speech sample comprises:

performing Fourier transform on the speech sample through the first feature transform layer, to obtain an amplitude spectrum and a phase spectrum of the speech sample;

filtering the magnitude spectrum through the filtering processing layer to obtain a target magnitude spectrum, and perform phase correction on the phase spectrum to obtain a target phase spectrum; and multiplying the target magnitude spectrum and the target phase spectrum through the second feature transform layer, and performing inverse Fourier transform on a multiplication result, to obtain the target speech sample.

18. The non-transitory computer-readable storage medium according to claim 16, wherein the content difference processing layer comprises: a Fourier transform layer; and the determining a content difference between content of the target speech sample and content of the speech sample through the content difference processing layer comprises:

performing Fourier transform on the target speech sample through the Fourier transform layer, to obtain a first magnitude spectrum, and performing Fourier transform on the speech sample, to obtain a second magnitude spectrum; and determining a magnitude difference between the first magnitude spectrum and the second magnitude spectrum, and determining the magnitude difference as the content difference between the content of the target speech sample and the content of the speech sample.

19. The non-transitory computer-readable storage medium according to claim 16, wherein the pronunciation difference processing layer comprises: a pronunciation score loss processing layer; and the updating the speech noise reduction model based on the pronunciation prediction result and the content difference comprises:

determining, through the pronunciation scoring loss processing layer, a difference between the pronunciation prediction result and a sample label corresponding to the speech sample, and determining a value of a scoring loss function based on the difference; and updating the model parameter of the speech noise reduction model based on the content difference and the value of the scoring loss function.

20. The non-transitory computer-readable storage medium according to claim 19, wherein the updating the model parameter of the speech noise reduction model based on the content difference and the value of the scoring loss function comprises:

obtaining a first weight value corresponding to the content difference and a second weight value corresponding to the value of the scoring loss function;

performing weighting processing on the content difference and the value of the scoring loss function based on the first weight value and the second weight value, to obtain the value of the loss function of the speech noise reduction model; and updating the model parameter of the speech noise reduction model based on the value of the loss function.

* * * * *